(12) United States Patent
Durward

(10) Patent No.: US 7,500,834 B2
(45) Date of Patent: Mar. 10, 2009

(54) METHOD AND APPARATUS FOR ENHANCING FLUID VELOCITIES IN PIPELINES

(76) Inventor: Robert Bonthron Durward, P.O. Box 1689, Rocky Mountain House, Alberta (CA) T4T 1B3

( * ) Notice: Subject to any disclaimer, the term of this patent is extended or adjusted under 35 U.S.C. 154(b) by 512 days.

(21) Appl. No.: 10/788,978

(22) Filed: Feb. 27, 2004

(65) Prior Publication Data

US 2004/0247451 A1    Dec. 9, 2004

(30) Foreign Application Priority Data

Feb. 28, 2003    (CA)    .................. 2420476

(51) Int. Cl.
*F04B 19/14* (2006.01)
*B08B 3/00* (2006.01)

(52) U.S. Cl. .................. 417/320; 137/15.04

(58) Field of Classification Search ........... 417/320, 417/410.1; 137/237, 15.04
See application file for complete search history.

(56) References Cited

U.S. PATENT DOCUMENTS

| | | | | |
|---|---|---|---|---|
| 712,488 A | * | 11/1902 | Black .................. | 166/241.3 |
| 2,887,118 A | * | 5/1959 | Loeffler et al. ........... | 134/112 |
| 3,585,423 A | | 6/1971 | Bolton et al. ........... | 310/13 |
| 3,691,819 A | * | 9/1972 | Guest .................. | 73/40.5 A |
| 3,768,417 A | | 10/1973 | Thornton et al. ......... | 104/148 |
| 3,770,995 A | | 11/1973 | Eastham et al. ......... | 310/13 |
| 4,437,799 A | | 3/1984 | Liu et al. ............. | 406/198 |
| 4,596,516 A | * | 6/1986 | Scott et al. ........... | 417/58 |
| 5,127,773 A | * | 7/1992 | Foreman et al. ......... | 406/179 |
| 5,270,593 A | | 12/1993 | Levi et al. ............ | 310/12 |
| 5,868,077 A | | 2/1999 | Kuznetsov ........... | 104/281 |
| 5,903,945 A | | 5/1999 | Lundie | |
| 5,924,158 A | | 7/1999 | Watts | |
| 6,044,770 A | | 4/2000 | Davey et al. .......... | 104/282 |
| 6,450,103 B2 | | 9/2002 | Svensson ........... | 104/120 |
| 6,500,271 B1 | | 12/2002 | Moore | |
| 6,613,261 B2 | | 9/2003 | Knapp | |
| 6,651,744 B1 | | 11/2003 | Crawford | |
| 6,679,129 B2 | | 1/2004 | Savard | |
| D491,325 S | | 6/2004 | Hawkins | |
| 6,792,641 B1 | | 9/2004 | Laker | |
| 6,857,329 B2 | | 2/2005 | Savard | |
| 6,874,193 B2 | | 4/2005 | Pruett | |
| 7,000,280 B1 | | 2/2006 | Knapp | |
| 2002/0040657 A1 | | 4/2002 | Davey .............. | 104/282 |
| 2002/0178965 A1 | | 12/2002 | Davey .............. | 104/281 |

FOREIGN PATENT DOCUMENTS

JP    11116051    4/1999

\* cited by examiner

*Primary Examiner*—Michael Cuff
*Assistant Examiner*—Vikansha S Dwivedi
(74) *Attorney, Agent, or Firm*—Christensen O'Connor Johnson Kindness PLLC

(57) ABSTRACT

A method and apparatus of enhancing fluid velocity in a pipeline includes a step of driving pipeline pigs sequentially through a pipeline containing fluid at speeds in excess of that provided by a pressure system for the pipeline. Fluid is both pushed ahead by the pipeline pigs and drawn behind by areas of low pressure created by the passage of the pipeline pigs through the pipeline. In accordance with the teachings herein, the fluid speed can be increased to a multiple of that provided by the pressure system for the pipeline, thereby multiplying the capacity of the pipeline.

39 Claims, 15 Drawing Sheets

METHOD AND APPARATUS FOR ENHANCING FLUID VELOCITIES IN PIPELINES

FIELD OF INVENTION

This invention relates to increasing the velocity of a fluid being transported in a pipeline. The system can also be adapted to move fluids and capsules simultaneously in a pipeline system.

BACKGROUND OF INVENTION

Fluid transportation in pipelines is well understood. The current engineering paradigm to move fluids in a pipeline is through the design and use of "pressure driven" systems. This means that in order for a fluid to move in a pipeline, the pressure at the inlet to a pipe section must be higher than the pressure at the outlet of the pipe section. To increase pressure in the pipeline, a compressor or pumping facility is added to the pipeline system at strategic point sources as determined by the pipeline system's hydraulic profile.

The throughput capacity of these systems is determined by: 1) the pipe diameter; 2) the inlet pressure of the pipe section and; 3) the pressure differential between the ends of the pipe section. Increases in pipe diameter, inlet pressure and pressure differential yield increases in throughput. These variables are optimized for a given throughput during the design of any pressure driven pipeline system.

A significant drawback of the "pressure driven" system is that they induce very low fluid velocities. For example, in operating large diameter pipeline systems, fluid velocities typically range in the order of 6-16 km/hr depending upon the type of fluid being transported.

Existing pipelines continue to deteriorate through corrosion, stress corrosion cracking and metal fatigue. With incorporation of systems for higher fluid velocities it would allow the existing pipelines to operate at lower pressures without decreasing throughput. Therefore, the operating and economic life of the pipeline would be extended without unduly compromising health, safety or the environment.

As new pipelines are required, incorporation of systems to increase fluid velocities would dramatically reduce the size of pipe required under conventional pressure driven designs. This translates into substantial savings in material and installation costs and the viability of pipelining products to market is greatly enhanced.

From a customer service perspective, a pipeline fitted with high velocity systems would allow for significant increases in throughput without the need for pipeline looping or additional pressurization facilities. By avoiding the lengthy process (which typically exceeds one year for large diameter pipelines) of planning, designing, permitting, acquiring rights-of-way and constructing facilities, customer requests for new transportation services are accommodated immediately.

From a resource management perspective, a faster flowing fluid gets the product to the market quicker and the pipeline system can respond quicker to changes in demand for the product or to commodity price fluctuations for the fluid in the pipeline.

With the use of high velocity systems, other products which are conventionally transported by truck or rail, can be more economically transported by pipelines. In fact, any product that will flow (e.g. Coal slurries) or can be fluidized (e.g. Grain) can be accommodated by higher velocity pipeline systems.

From an environmental perspective, the use of higher velocity pipeline systems minimizes the emission of greenhouse gases, minimizes land use and eliminates destruction of wildlife habitat associated with constructing new pipelines.

From an economic point of view if the speed of fluid passing through the pipeline is doubled, the capacity of the pipeline is doubled.

SUMMARY OF INVENTION

What is required is a method and apparatus for increasing fluid velocities in pipelines.

In accordance with one aspect of the present invention, there is provided a method of enhancing fluid velocity in a pipeline which involves a single step of driving pipeline pigs sequentially through a pipeline containing fluid at speeds in excess of that provided by a pressure system for the pipeline. When pipeline pigs are travelling at high speeds, fluid is pushed ahead by the pipeline pigs and fluid is drawn behind the pipeline pigs by areas of low pressure created by the passage of the pipeline pigs through the pipeline.

Although this method can be used for marginal increases in fluid speed, it is anticipated that the speed of the pipeline pigs will be a multiple of the fluid speed provided by the pressure system for the pipeline, thereby multiplying the capacity of the pipeline. A doubling of the fluid speed will double the capacity of the pipeline, the tripling of the fluid speed will triple the capacity of the pipeline, and so on.

There will now be described some preferred embodiments in which a variety of electromagnetic systems are used to dramatically increase the velocity of a fluid in a pipeline. Electrical power is generated and conditioned such that multi-phased power is supplied to a plurality of coils. The coils can be externally or internally mounted on/in the pipe. A magnetized pipeline pig is inserted into the pipeline. The magnetic field generated by the coils interacts with the magnetic field in the pipeline pig. By adjusting the voltage and frequency of the multi-phased power, the pipeline pig is propelled through the pipeline at dramatically greater speeds than the fluid was flowing prior to the introduction of the pipeline pig. By propelling a sequence of synchronized pipeline pigs, the fluid flows faster.

An electromagnetic system may be used as the only method for moving fluids in a pipeline but it is most likely to be combined with a pressure driven system. When an electromagnetic system and a pressure driven system are used, the electromagnetic system is used to manage the velocity of the fluid and the pressure driven system is used to manage the density/pressure of the fluid. Two preferred embodiments will be hereinafter described. The first embodiment is an Inline Electromagnetic Thruster System and the second embodiment is an Offset Electromagnetic Thruster System. An Inline Electromagnetic Thruster System can have infinite length and can be used for an entire pipeline system. An offset electromagnetic thruster system can be used at selected locations where it is desirable to increase fluid velocity or pressure. It is typically used for shorter sections between pressure facilities.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PRESENTLY PREFERRED EMBODIMENTS

The two preferred embodiments will now be described with reference to FIGS. 1 through 15.

Structure of Inline Electromagnetic Thruster System

Figure 1:
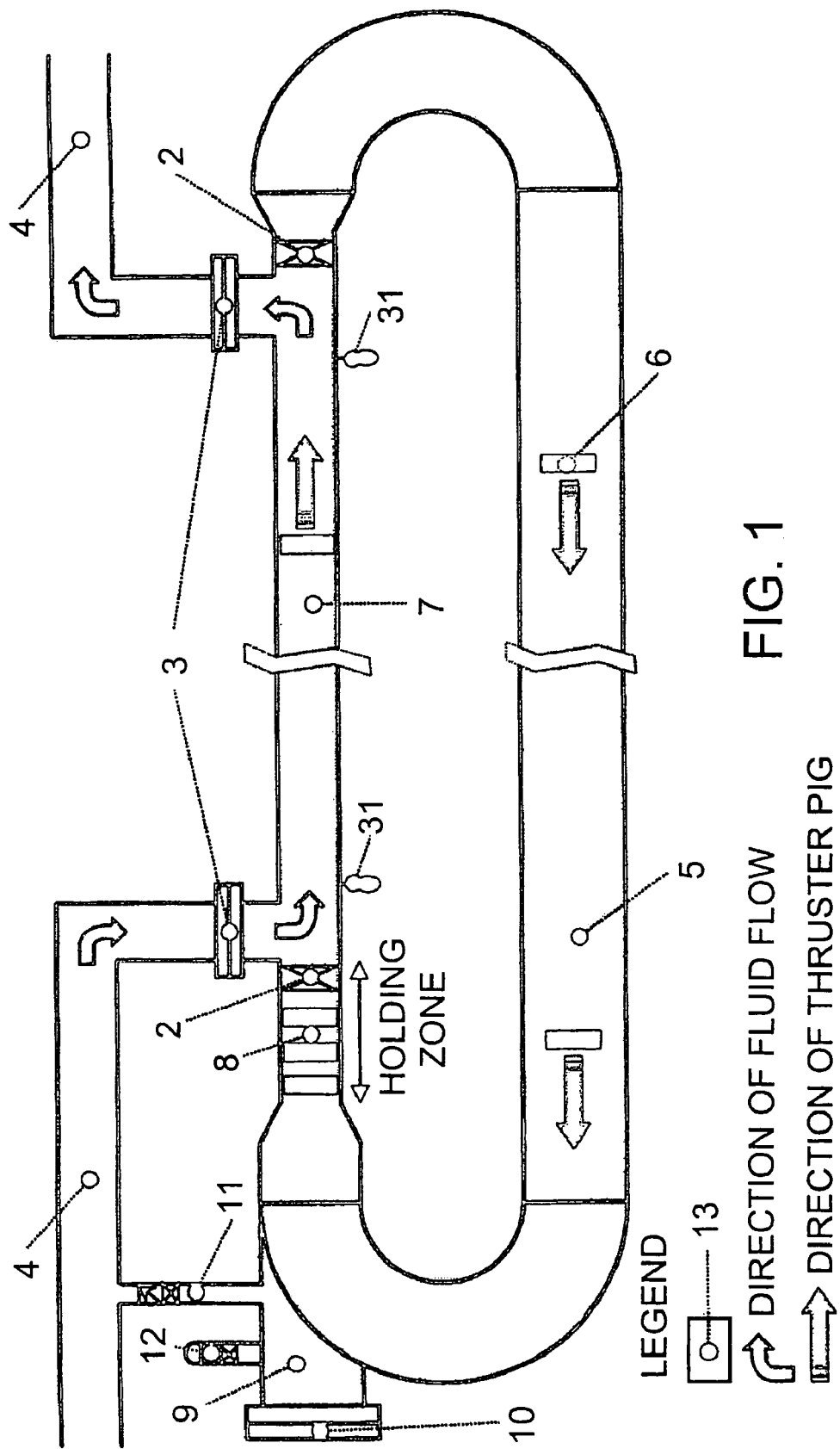
FIG. 1 is a graphic illustration of a first embodiment of apparatus for enhancing fluid velocities in pipelines constructed in accordance with the teachings of the present invention.

Referring to FIG. 1, fluid from a Carrier Pipe (4) is diverted into the Inline Electromagnetic Thruster System and the Thruster System Velocity Enhancement Piping (7) so that piping (7) replaces the Carrier Pipe (4). Within the thruster system, the fluid velocity is increased by the electromagnetic propulsion of the pipeline pigs. The faster moving fluid is then re-injected back into the main pipeline thereby increasing the fluid pressure in the downstream section of the pipeline system. The Inline Electromagnetic Thruster System can also increase the pressure in the system piping by ensuring a snug fit between the Pipeline pig (6) and the Thruster System Velocity Enhancement Piping (7).

Two branch connections from the main pipeline are made to direct fluid into and away from the Electromagnetic Thruster System. A diametric reducer may be required if the diameter of the branch connection piping is different than the diameter of the main pipeline. Thruster System Isolation Valves (2) are installed as shown to isolate the Thruster System Return Piping (5) and the Pipeline pig Loading/Unloading Facility (9) from the Thruster System Velocity Enhancement Piping (7). Therefore maintenance can be conducted on the return piping and loading/unloading facilities without taking the Carrier Pipe (4) out of service. The Electromagnetic Thruster System is connected to the branch piping by flange connections (3). The flange connection may incorporate an insulating kit. For new construction, the Thruster System Return Piping (5), Thruster System Velocity Enhancement Piping (7), Holding Zone Piping (8) and Pipeline pig Loading/Unloading Facility (9) may be made from non-ferromagnetic pipe material which is capable of withstanding high pressures. For retrofitting an existing steel Carrier Pipe, a liner configuration, as in FIGS. 9 and 10, may be used instead of an externally applied coil system where the magnetic saturation of the steel pipe occurs before a sufficient magnetic field can be generated on the inside of the steel pipe. The Electromagnetic Coil Assembly (13) is impregnated into the non-ferromagnetic material. Another embodiment would be to incorporate the series of interconnected coils on the outside of the non-ferromagnetic pipe material as shown in FIGS. 3-8 inclusive. The inside diameter of the Holding Zone Piping (8) and the Pipeline pig (6) outside diameter are the same. The inside surface of the Holding Zone Piping (8) and the outside surface of the Pipeline pig (6) are compatible to form a seal such that fluid does not flow through the Holding Zone Piping (8). The inside diameter of the Thruster System Return Piping (5) is greater than the inside diameter of the Holding Zone Piping (8) and the Thruster System Velocity Enhancement Piping (7). This allows fluid to bypass the Pipeline pig (6) as it moves in the Thruster System Return Piping (5). As the fluid cannot get through the Holding Zone Piping (5), it is forced to move through the outlet branch connection and back into the Carrier Pipe (4). A Pipeline pig Loading/Unloading Facility (9) is connected to the Thruster System Return Piping (5) in order to load and unload pipeline pigs when the Electromagnetic Thruster System is not operating. The location of the Pipeline pig Loading/Unloading Facility (9) is conveniently located on the Thruster System Return Piping (5). The Holding Zone Piping (8) is part of the Electromagnetic Coil Assembly (13) and is constructed in a manner that the current in the coils is variable and reversible allowing a group of Pipeline pigs (6) in the Holding Zone Piping (8) to restrict passage of fluid from the inlet branch connection of the Electromagnetic Thruster System and from the Thruster System Return Piping (5). The electromagnetic Holding Zone Piping (8) is constructed in a manner that the current in the coils is variable and reversible allowing the leading Pipeline pig to be driven into the Thruster System Velocity Enhancement Piping (7). The outside diameter of the Pipeline pig (6) is equal to or less than the inside diameter of the Thruster System Velocity Enhancement Piping (7) depending on whether the fluid is to be compressed as well as having its velocity increased. The Pipeline pig (6) is propelled by a traveling electromagnetic field created by a multi-phase current energizing the coils in the Electromagnetic Coil Assembly (13). The Pipeline pig (6) is suspended in the Thruster System Return Piping (5) by the traveling electromagnetic field created by a multi-phase current energizing the coils in the Electromagnetic Coil Assembly (13). A magnetic field is created in the Pipeline pig (6) by permanent magnet(s) and/or direct current electromagnet(s) and/or induced electromagnet(s) and/or by superconductor magnets. The speed of the Pipeline pigs (6) is controlled by a multi-phase variable voltage variable frequency power source. The Pipeline pigs (6) are tracked in the Thruster System Velocity Enhancement Piping (7) via pressure transducers, or similar measuring devices, located at the inlet and the outlet of the Thruster System Velocity Enhancement Piping (7) or periodically located in the Thruster System Velocity Enhancement Piping (7). Fluid velocity and pressure data is transmitted to an onsite control center where adjustments to the electromagnetic system are automatically made to ensure that the piping is not pressurized beyond the maximum allowable operating pressure of the piping. Pressure and fluid velocity data are transmitted to an offsite control center such that the Electromagnetic Thruster System output pressures and flow rates are compatible with upstream and downstream conditions. The Electromagnetic Thruster System can be modified to work for any fluid including but not limited to a gas, a liquid, a fluidized solid. The Electromagnetic Thruster System can be modified for capsules with appropriate modifications to piping to accommodate the size of the capsules. The Electromagnetic Thruster System can be designed to work for any operating pressure of the carrier pipe. The Electromagnetic Thruster System can be designed to accommodate any diameter of the carrier pipe. The Electromagnetic Thruster System can be designed to accommodate the throughput capacity of the carrier pipe.

Operation of the Inline Electromagnetic Thruster System:

Referring to FIG. 1, the Inline Electromagnetic Thruster System operates as follows. The initial piping configuration is as follows: the Purging Assembly (11) is closed; the Drain Assembly (12) is closed and; the two Thruster System Isolation Valves (2) are closed. Fluid is flowing through the Thruster System Velocity Enhancement Piping (7). The Thruster System Return Piping is depressurized by opening the Drain Assembly (12) which is connected to a receiving facility. The Pipeline pig Loading/Unloading Flange (10) is removed. The appropriate number of Pipeline pigs (6) are manually loaded into the Pipeline pig Loading/Unloading Facility (9). The Pipeline pig Loading/Unloading Flange (10) is put back on. The Electromagnetic Coil Assembly (13) in the Thruster System Return Piping (5) is turned on and the Pipeline pigs are moved to the Holding Zone Piping (8) where a strong magnetic field has been established. The electromagnetic field in the Holding Zone Piping (8) holds the Pipeline pigs (6) in place. The tight fit between the Pipeline pigs' (6) outside surface and the inside of the Holding Zone Piping (8) creates a seal sufficient to withstand the maximum operating pressure of the Carrier Pipe. The Thruster System Isolation Valve (2) near the outlet of the system is opened slowly to fill the Thruster System Return Piping (5) with fluid and at a pressure equivalent to the pressure of the Carrier Pipe. The Thruster System Isolation Valve (2) near the inlet of the system is opened slowly. The leading edge of the coils in the Holding Zone Piping (8) is energized such that the first pipeline pig is propelled into the Thruster System Velocity Enhancement Piping (7). The remaining Pipeline pigs (6) in the Holding Zone Piping (8) are advanced one position by altering the current in the coils of the Holding Zone Piping (8). The coils in the Thruster System Velocity Enhancement Piping (7) are energized such that the first Pipeline pig (6) is accelerated to high speeds and propels the fluid forward through the Thruster System Velocity Enhancement Piping (7) toward the outlet of the Inline Electromagnetic Thruster System. Once the Pipeline pig (6) moves past the outlet of the Thruster System Velocity Enhancement Piping (7), it moves into the Thruster System Return Piping (5) where it is suspended and propelled by an electromagnetic field. As the inside diameter of the Thruster System Return Piping (5) is greater than the diameter of Pipeline pig (6), fluid in the Thruster System Return Piping (5) is not compressed by the movement of the first Pipeline pig (6) and the pressure remains the same as the pressure at the outlet of the Inline Electromagnetic Thruster System. The first Pipeline pig (6) is propelled through the Thruster System Return Piping (5) until it enters the Holding Zone Piping (8). Using programmable switching devices, the second Pipeline pig (6) is launched into the Thruster System Velocity Enhancement Piping (7) and Thruster System Return Piping (5) in the same fashion as the first Pipeline pig (6). Pipeline pigs (6) continue to be launched until the pressure in the Carrier Pipe (4) reaches the desired operating pressure or until the maximum operating pressure of the Carrier Pipe (4) is reached. The launching frequency of the Pipeline pigs (6) and the speed of the Pipeline pigs (6) in the Thruster System Velocity Enhancement Piping (7) are adjusted to maintain the desired operating pressure in the Carrier Pipe (4).

To take the Inline Electromagnetic Thruster System out of service, the following steps are undertaken: The Purging Assembly (11) is opened. Pipeline pigs (6) are ceased to be released from the Holding Zone Piping (8). The Thruster System Isolation Valve (2) near the inlet of the system is closed slowly. The active Pipeline pigs (6) are propelled through the Thruster System Velocity Enhancement Piping (7) and the Thruster System Return Piping (5) until all the Pipeline pigs (6) are in the Holding Zone Piping (8). The Thruster Station Isolation Valve (2) near the outlet of the system is closed slowly. The Purging Assembly (11) is closed. The Drain Assembly (12) near the Pipeline pig Loading/Unloading Flange (10) is opened and the drain connected to a receiving facility. The current in the Electromagnetic Coil Assembly (13) is reversed such that the Pipeline pigs (6) travel backward in to the Pipeline pig Loading/Unloading Facility (9). Once all Pipeline pigs (6) are in the Pipeline pig Loading/Unloading Facility (9), the power to the Electromagnetic Coil Assembly (13) is turned off and the coils de-energized if required. The Pipeline pig Loading/Unloading Flange (10) is taken off and the Pipeline pigs (6) removed from the Pipeline pig Loading/Unloading Facility (9). The Drain Assembly (12) is closed and the piping capped. The Pipeline pig Loading/Unloading Flange is put back on.

Advantages of the Inline Electromagnetic Thruster System:

The Electromagnetic Thruster System has many advantages when added to pipeline systems, some of which are as follows:

1) The capacity of the Carrier Pipe is increased.
2) The operating flexibility of the Carrier Pipe is enhanced as the velocities of the pipeline pigs can be varied such that the speed of the fluid coming out of the Inline Electromagnetic Thruster System is variable over a large range of speeds.
3) Maintenance related pigging of the Carrier Pipe can be conducted using normal pipeline practices.
4) With the exception of the pipeline pigs, the Inline Electromagnetic Thruster System has no moving parts and therefore maintenance requirements are minimized.
5) All of the piping can be prefabricated in a shop environment and pre-tested prior to delivery to the site. Therefore, quality control of system components is maximized.

6) The location of the Inline Electromagnetic Thruster System can be selected to coincide with available power sources and/or space for the facility.

Structure of Offset Electromagnetic Thruster System

Figure 2:
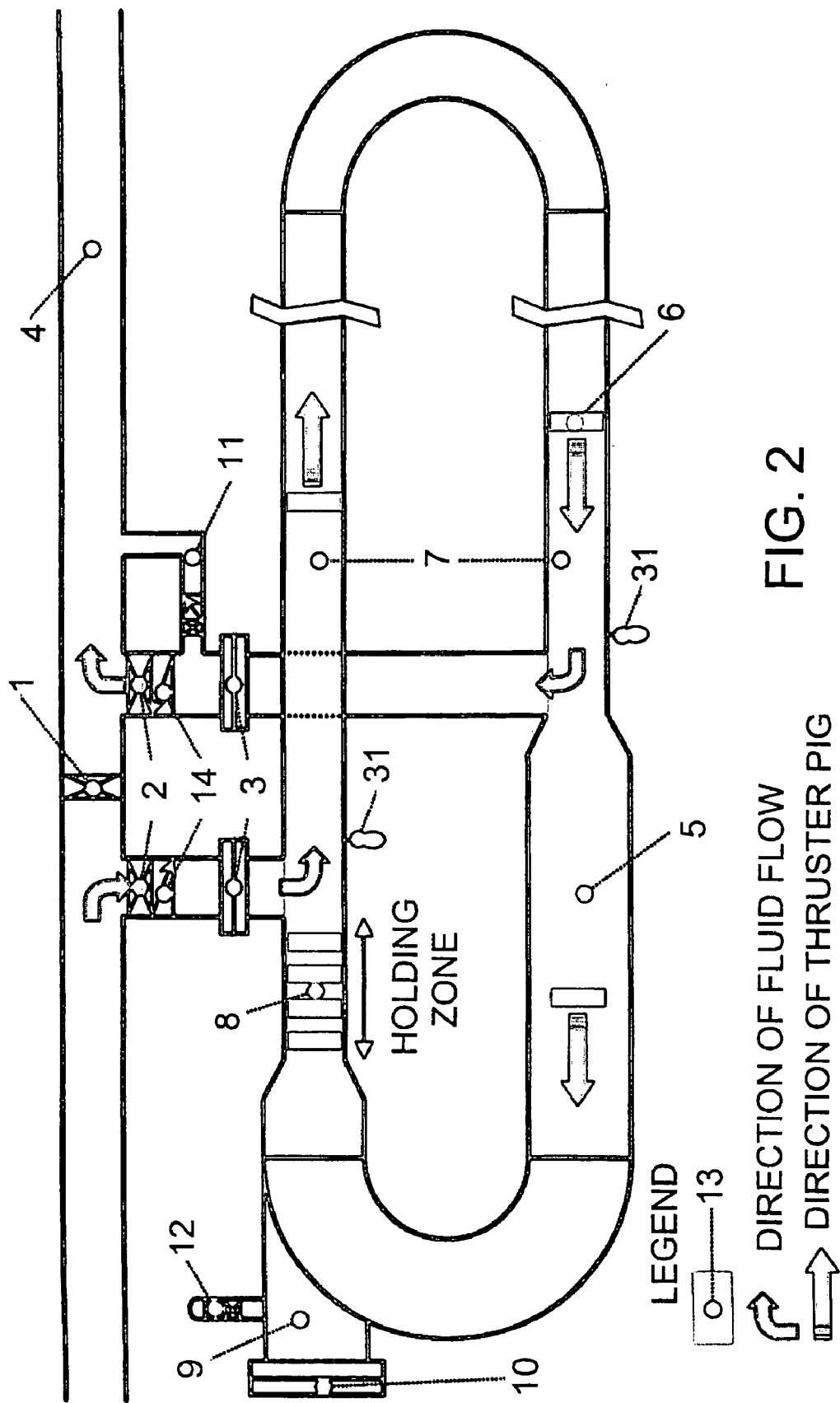
FIG. 2 is a graphic illustration of a second embodiment of apparatus for enhancing fluid velocities in pipelines constructed in accordance with the teachings of the present invention.

Referring to FIG. 2, fluid from the Carrier Pipe (4) is diverted into the Offset Electromagnetic Thruster System. Within the thruster system, the fluid velocity is increased by electromagnetic propulsion of the pipeline pigs. The faster moving fluid is then re-injected back into the Carrier Pipe (4) thereby increasing the pressure and velocity of the fluid in the downstream section of the pipeline system. The Offset Electromagnetic Thruster System can also increase the pressure in the system piping by ensuring a snug fit between the Pipeline pig (6) and the Thruster System Velocity Enhancement Piping (7). Fluid is diverted from the Carrier Pipe (4) by inserting a control valve (1). Two branch connections from the Carrier Pipe (4) are made to direct fluid into and away from the Electromagnetic Thruster System. The inlet branch connection to the Electromagnetic Thruster System is located upstream of the control valve (1). The outlet branch connection from the Electromagnetic Thruster System is located downstream of the control valve (1). A diametric reducer may be required if the diameter of the branch connection piping is different than the diameter of the Carrier Pipe (4). A Thruster System Isolation Valve (2) is installed on each branch connection to isolate the Electromagnetic Thruster System from the Carrier Pipe (4). A Flow Control Check Valve (14) is installed on each branch connection to ensure that fluid flow is maintained in the proper direction. The Electromagnetic Thruster System is connected to the branch piping by flange connections (3) which may include insulating kits. The Thruster System Return Piping (5), Thruster System Velocity Enhancement Piping (7), Holding Zone Piping (8) and Pipeline pig Loading/Unloading Facility (9) are made from non-ferromagnetic pipe material which is capable of withstanding high pressures. The Electromagnetic Coil Assembly (13) is impregnated into the non-ferromagnetic material. Another embodiment would be to incorporate the series of interconnected coils on the outside of the non-ferromagnetic pipe material as shown in FIGS. 3-8 inclusive. The inside diameter of the Holding Zone Piping (8) and the Pipeline pig (6) outside diameter are the same. The inside surface of the Holding Zone Piping (8) and the outside surface of the Pipeline pig (6) are compatible to form a seal such that fluid does not flow through the Holding Zone Piping (8). The inside diameter of the Thruster System Return Piping (5) is greater than the inside diameter of the Holding Zone Piping (8) and the Thruster System Velocity Enhancement Piping (7). This allows fluid to bypass the Pipeline pig (6) as it moves in the Thruster System Return Piping (5). As the fluid cannot get through the Holding Zone Piping (5), it is forced to move through the outlet branch connection and back into the Carrier Pipe (4). A Pipeline pig Loading/Unloading Facility (9) is connected to the Thruster System Return Piping (5) in order to load and unload Pipeline pigs (6) when the Electromagnetic Thruster System is not operating. The location of the Pipeline pig Loading/Unloading Facility (9) is conveniently located on the Thruster System Return Piping (5). The Holding Zone Piping (8) is part of the Electromagnetic Coil Assembly (13) and is constructed in a manner that the current in the coils is variable and reversible allowing a group of Pipeline pigs (6) in the Holding Zone Piping (8) to restrict passage of fluid from the inlet branch connection of the Electromagnetic Thruster System and from the Thruster System Return Piping (5). The electromagnetic Holding Zone Piping (8) is constructed in a manner that the current in the coils is variable and reversible allowing the leading Pipeline pig to be driven into the Thruster System Velocity Enhancement Piping (7). The outside diameter of the Pipeline pig (6) is equal to or less than the inside diameter of the Thruster System Velocity Enhancement Piping (7) depending on whether the fluid is to be compressed as well as having it's velocity increased. The Pipeline pig (6) is propelled by a traveling electromagnetic field created by a multi-phase current energizing the coils in the Electromagnetic Coil Assembly (13). The Pipeline pig (6) is suspended in the Thruster System Return Piping (5) by the traveling electromagnetic field created by a multi-phase current energizing the coils in the Electromagnetic Coil Assembly (13). A magnetic field is created in the Pipeline pig (6) by permanent magnet(s) and/or direct current electromagnet(s) and/or induced electromagnet(s) and/or superconductor magnet(s). The speed of the Pipeline pigs (6) is controlled by a multi-phase variable voltage variable frequency power source. The Pipeline pigs (6) are tracked in the Thruster System Velocity Enhancement Piping (7) via pressure transducers, or similar measuring devices located at the inlet and the outlet of the Thruster System Velocity Enhancement Piping (7). Fluid velocity and pressure data is transmitted to an onsite control center where adjustments to the electromagnetic system are automatically made to ensure that the piping is not pressurized beyond the maximum allowable operating pressure of the piping. Pressure and fluid velocity data are transmitted to an offsite control center such that the Electromagnetic Thruster System output pressures and flow rates are compatible with upstream and downstream conditions. The Electromagnetic Thruster System can be modified to work for any fluid including but not limited to a gas, a liquid, a fluidized solid. The Electromagnetic Thruster System can be modified for capsules with appropriate modifications to piping to accommodate the size of the capsules. The Electromagnetic Thruster System can be designed to work for any operating pressure of the carrier pipe. The Electromagnetic Thruster System can be designed to accommodate any diameter of the carrier pipe. The Electromagnetic Thruster System can be designed to accommodate the throughput capacity of the carrier pipe.

The Offset Electromagnetic Thruster System outlined in FIG. 2 can be modified as follows: The Thruster System Velocity Enhancement Piping (7) is modified from a straight length of pipe to a vertical or horizontal coil. This can dramatically increase the length of the Thruster System Velocity Enhancement Piping (7) and reduces the amount of land required for the Offset Electromagnetic Thruster System. The Thruster System Return Piping (5) is modified to accommodate the coiled Thruster System Velocity Enhancement Piping (7).

Operation of the Offset Electromagnetic Thruster System:

Referring to FIG. 2, once the Electromagnetic Thruster System has been installed, the system can be operated as follows. The initial piping configuration is as follows: the Control valve (1) is open; the Purging Assembly (11) is closed and; the two Thruster System Isolation Valves (2) are closed. The Electromagnetic Thruster System piping is depressurized. The Pipeline pig Loading/Unloading Flange (10) is removed. The appropriate number of Pipeline pigs (6) are manually loaded into the Pipeline pig Loading/Unloading Facility (9). The Pipeline pig Loading/Unloading Flange (10) is put back on. The Electromagnetic Coil Assembly (13) in the Thruster System Return Piping (5) is turned on and the Pipeline pigs are moved to the Holding Zone Piping (8) where a strong magnetic field has been established. The electromagnetic field in the Holding Zone Piping (8) holds the Pipeline pigs (6) in place. The tight fit between the Pipeline pigs' (6) outside surface and the inside of the Holding Zone Piping (8)

creates a seal sufficient to withstand the maximum operating pressure of the Carrier Pipe. The inlet Thruster System Isolation Valve (2) is opened slowly to fill the Thruster System Velocity Enhancement Piping (7) and the Thruster System Return Piping (5) with fluid and at a pressure equivalent to the pressure of the Carrier Pipe (4). The outlet Thruster System Isolation Valve (2) is opened slowly to provide circulation of fluid through the Electromagnetic Thruster System piping. The Control valve (1) is closed to divert all of the fluid in the Carrier Pipe through the Offset Electromagnetic Thruster System piping. The leading edge of the coils in the Holding Zone Piping (8) is energized such that the first pipeline pig is propelled into the Thruster System Velocity Enhancement Piping (7). The remaining Pipeline pigs (6) in the Holding Zone Piping (8) are advanced one position by altering the current in the coils of the Holding Zone Piping (8). The coils in the Thruster System Velocity Enhancement Piping (7) are energized such that the first Pipeline pig (6) is accelerated to high speeds and propels the fluid forward through the Thruster System Velocity Enhancement Piping (7) toward the outlet of the Offset Electromagnetic Thruster System. Once the Pipeline pig (6) moves past the outlet of the Offset Electromagnetic Thruster System, it moves into the Thruster System Return Piping (5) where it is suspended and propelled by an electromagnetic field. As the inside diameter of the Thruster System Return Piping (5) is greater than the diameter of Pipeline pig (6), fluid in the Thruster System Return Piping (5) is not compressed by the movement of the first Pipeline pig (6) and the pressure remains the same as the pressure at the outlet of the Offset Electromagnetic Thruster System. The first Pipeline pig (6) is propelled through the Thruster System Return Piping (5) until it enters the Holding Zone Piping (8). Using programmable switching devices, the second Pipeline pig (6) is launched into the Thruster System Velocity Enhancement Piping (7) and Thruster System Return Piping (5) in the same fashion as the first Pipeline pig (6). Pipeline pigs (6) continue to be launched until the pressure in the Carrier Pipe (4) reaches the desired operating pressure or until the maximum operating pressure of the Carrier Pipe (4) is reached. The launching frequency of the Pipeline pigs (6) and the speed of the Pipeline pigs (6) in the Thruster System Velocity Enhancement Piping (7) are adjusted to maintain the desired operating pressure in the Carrier Pipe (4).

To take the Offset Electromagnetic Thruster System out of service, the following steps are undertaken: The Control valve (1) is slowly opened to equalize the pressures on both sides of the valve. The Purging Assembly (11) is opened. The Thruster System Isolation Valves (2) are closed slowly. The speeds of the active Pipeline pigs (6) are adjusted to accommodate the lack of fluid inflow into the Offset Electromagnetic Thruster System Piping. The Pipeline pigs (6) continue to operate until the pressure in the Offset Electromagnetic Thruster System Piping is minimized. The Purging Assembly (11) is closed. The Drain Assembly (12) near the Pipeline pig Loading/Unloading Flange (10) is opened and the drain connected to a receiving facility. Once all the Pipeline pigs (6) are in the Holding Zone Piping (8), the current in the Electromagnetic Coil Assembly (13) is reversed such that the Pipeline pigs (6) travel backward in to the Pipeline pig Loading/Unloading Facility (9). Once all Pipeline pigs (6) are in the Pipeline pig Loading/Unloading Facility (9), the power to the Electromagnetic Coil Assembly (13) is turned off and the coils de-energized if required. The Pipeline pig Loading/Unloading Flange (10) is taken off and the Pipeline pigs (6) removed from the Pipeline pig Loading/Unloading Facility (9). The Drain Assembly (12) is closed and the piping capped. The Pipeline pig Loading/Unloading Flange is put back on.

Advantages of the Offset Electromagnetic Thruster Station:

The Electromagnetic Thruster Station has many advantages when added to pipeline systems, some of which are as follows:

1) The capacity of the Carrier Pipe is increased.
2) The operating flexibility of the Carrier Pipe is enhanced as the velocities of the pipeline pigs can be varied such that the speed of the fluid coming out of the Offset Electromagnetic Thruster System is variable over a large range of speeds.
3) Maintenance related pigging of the Carrier Pipe can be conducted using normal pipeline practices.
4) With the exception of the pipeline pigs, the Offset Electromagnetic Thruster Station has no moving parts and therefore maintenance requirements are minimized.
5) All of the piping can be prefabricated in a shop environment and pre-tested prior to delivery to the site. Therefore, quality control of system components is maximized.
6) The location of the Offset Electromagnetic Thruster System can be selected to coincide with available power sources.

Figure 3:
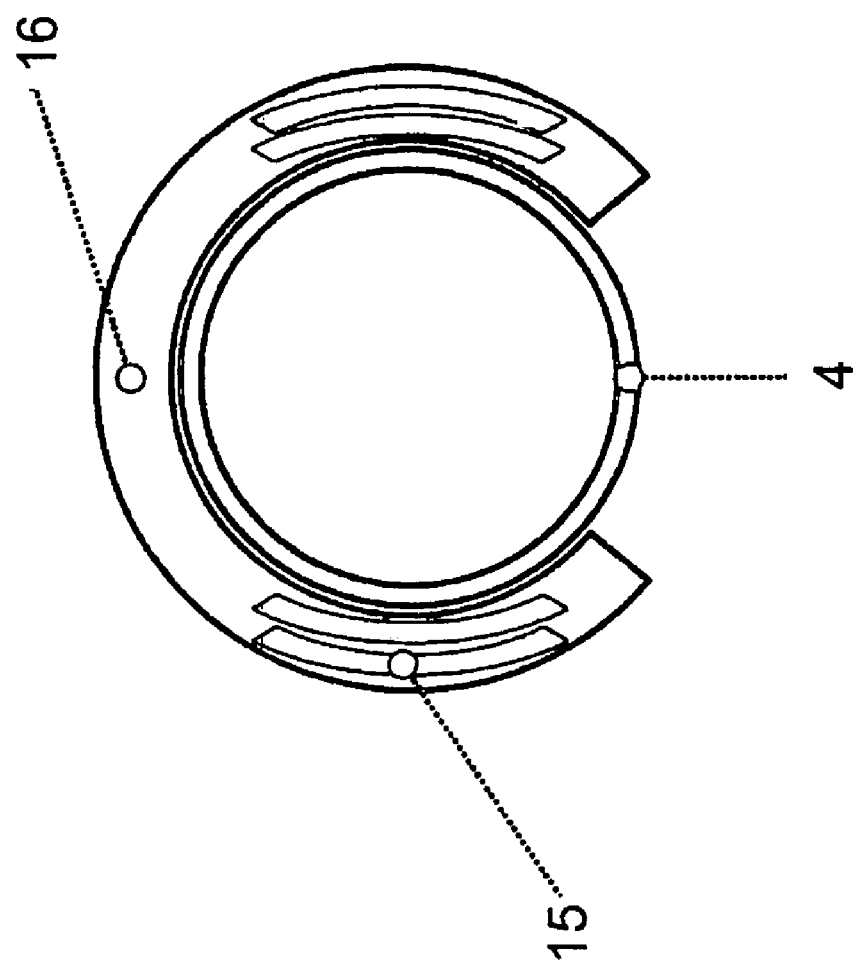
FIG. 3 is a end elevation view, in section, of a first electromagnetic coil configuration for use with the first embodiment illustrated in FIG. 1 and the second embodiment illustrated in FIG. 2.
Figure 4:
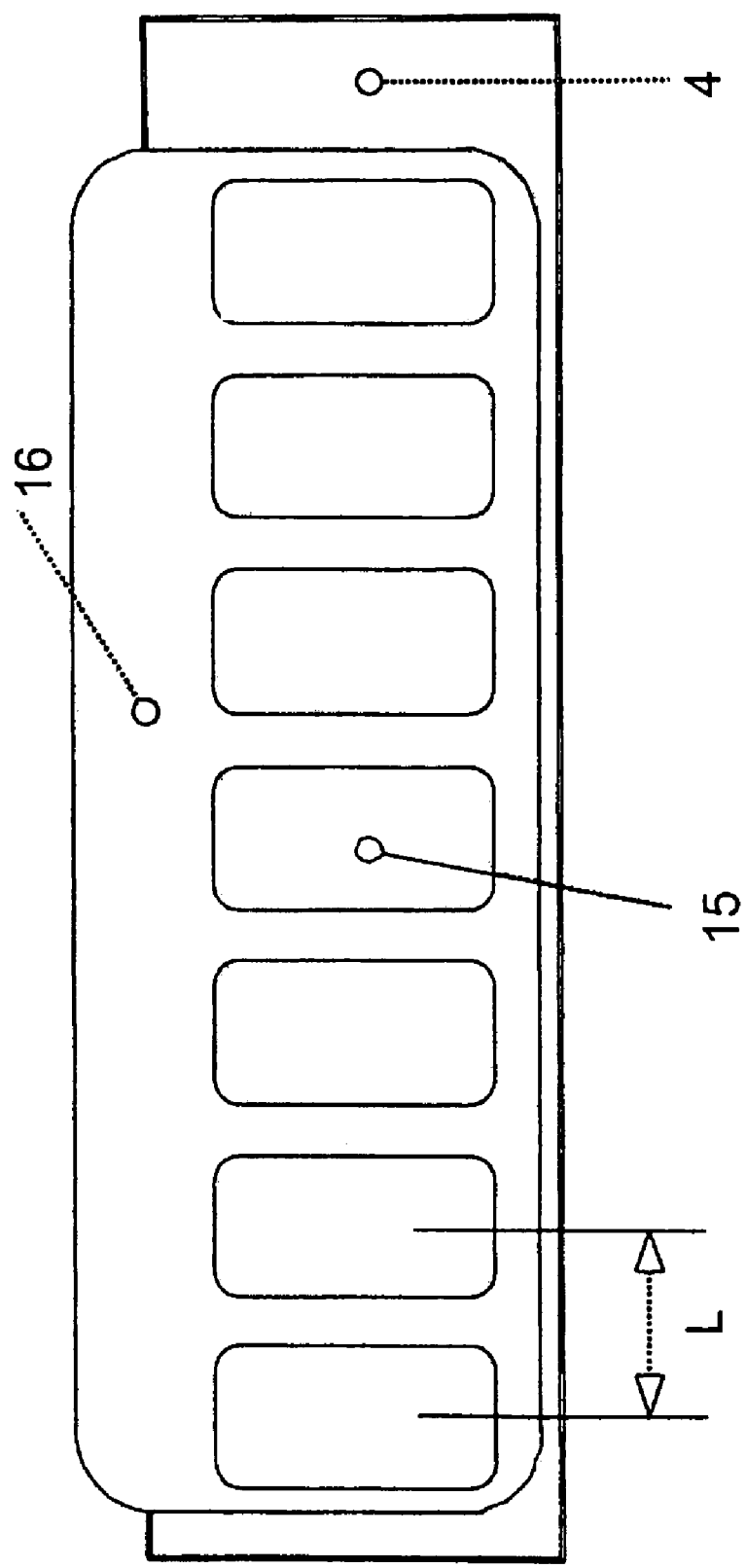
FIG. 4 is a side elevation view, in section, of the first electromagnetic coil configuration illustrated in FIG. 3.

Components of Electromagnetic Thruster Systems:

As shown on various figures, the components of the Electromagnetic Thruster System are as follows:

1) Control valve
2) Thruster System Isolation Valve
3) Steel to Non-Ferromagnetic Connection Flange (if required)
4) Carrier Pipe
5) Thruster System Return Piping (optional)
6) Pipeline pig
7) Thruster System Velocity Enhancement Piping
8) Holding Zone Piping acting as an electromagnetic valve
9) Pipeline pig Loading/Unloading Facility
10) Pipeline pig Loading/Unloading Flange
11) Purging Assembly
12) Drain Assembly
13) Electromagnetic Coil Assembly
14) Flow Control Check Valve
15) Coil of Insulated Wire or Plate
16) Flexible Material Containing Coil Assembly
17) Insulated Magnetic Laminated Material
18) Liner with Embedded Coil Assembly
19) Non-magnetic, non-conductive Material for Pipeline pig
20) Permanent Magnet
21) Mutually Insulated Laminations of Magnetic Material
22) Outer Sheath of Non-magnetic, Conductive Material
23) A), B), C); Phase Feed Cables
24) Controller
25) Power Cables to Coil Assembly
26) Transformer
27) Rectifier
28) Chopper
29) A), B), C); Inverter
30) Power Line from Local Grid
31) Pressure Transducer FIGS. 3 and 4: Exterior Wrap Coil Configuration FIGS. 3 and 4 illustrate a system which could be applied onto the outside of the Carrier Pipe (4). It can be applied during construction of a new pipeline or added to an existing pipeline system where additional fluid throughput is required.

Pluralities of rows of Coils of Insulated Wire or Plates (15) are embedded in a flexible material during manufacturing of the material and are formed into long narrow sheets. The width of the sheet varies with the diameter of the Carrier Pipe (4). The width will be such that the rows of coils are geometrically opposite each other when the sheet is centered on the top of the pipe. The length of each sheet is dependent upon weight and the thickness of the flexible material. For ease of transportation and installation, the sheets are wound on large spools at the end of the manufacturing process.

Optional reinforcing cables, power cables and telecommunication cables (all not shown in Figures) can also be embedded into the flexible material. The reinforcing cables could be used during loading, unloading and installation of the Flexible Material Containing Coil Assembly (16); the power cables could be used to supply power to the Coils of Insulated Wire or Plate (15) and; the telecommunication cables could carry operating data of the Electromagnetic System to a central pipeline operations center.

During the installation of the Flexible Material Containing Coil Assembly (16) onto the Carrier Pipe (4), the flexible material is centered on the top of the pipe. To ensure that coil wiring connections between sheets are completed correctly, the coils are energized with a small portable power supply and the continuity of the coil connections is confirmed. If the Carrier Pipe (4) is made from ferromagnetic material, current in the coils causes an electromagnetic field to occur and the coils will be attracted to the pipe such that the Flexible Material Containing Coil Assembly (16) conforms tightly to the pipe.

In the side view of FIG. 4, the Coils of Insulated Wire or Plate (15) are shown to be a distance "L" apart. This distance "L" is determined during the design of the Electromagnetic System and is in relation to the hydraulic head of the fluid, the frequency of the power supply and the desired speed of the fluid.

Figure 5:
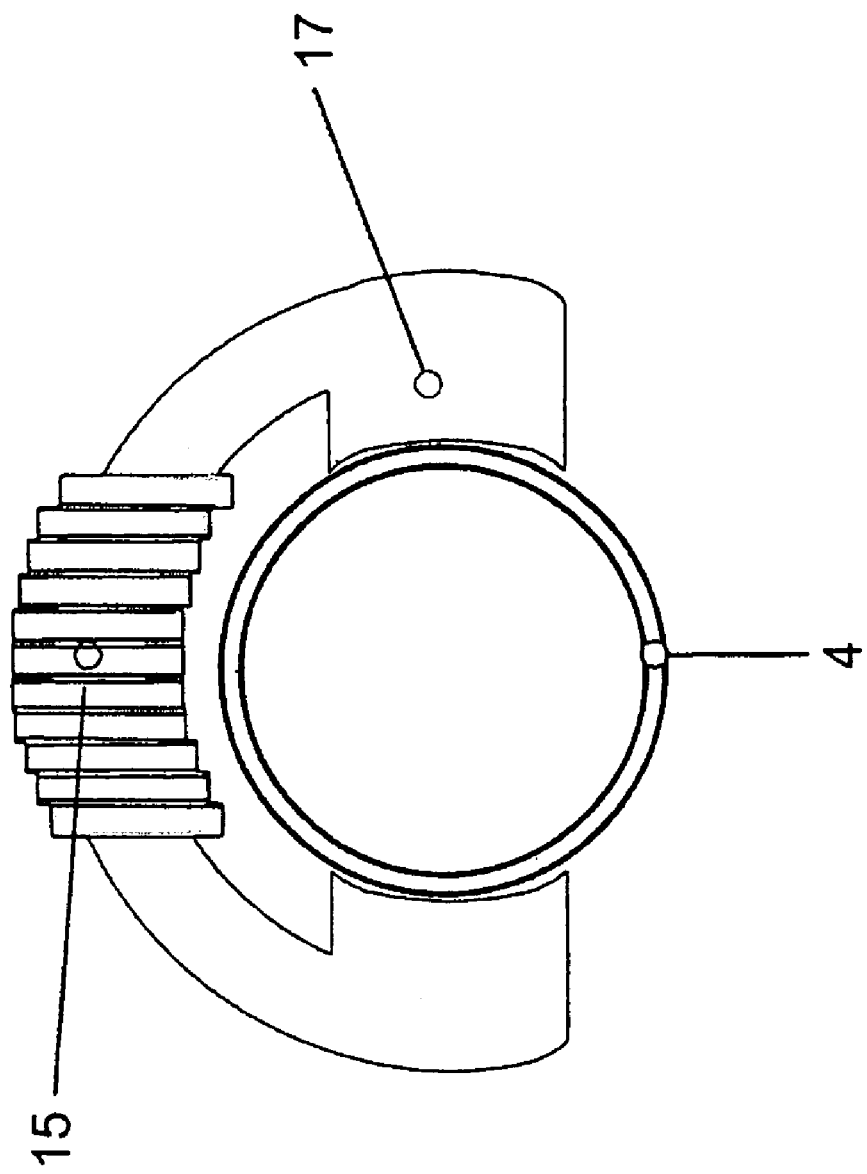
FIG. 5 is a end elevation view, in section, of a second electromagnetic coil configuration for use with the first embodiment illustrated in FIG. 1 and the second embodiment illustrated in FIG. 2.
Figure 6:
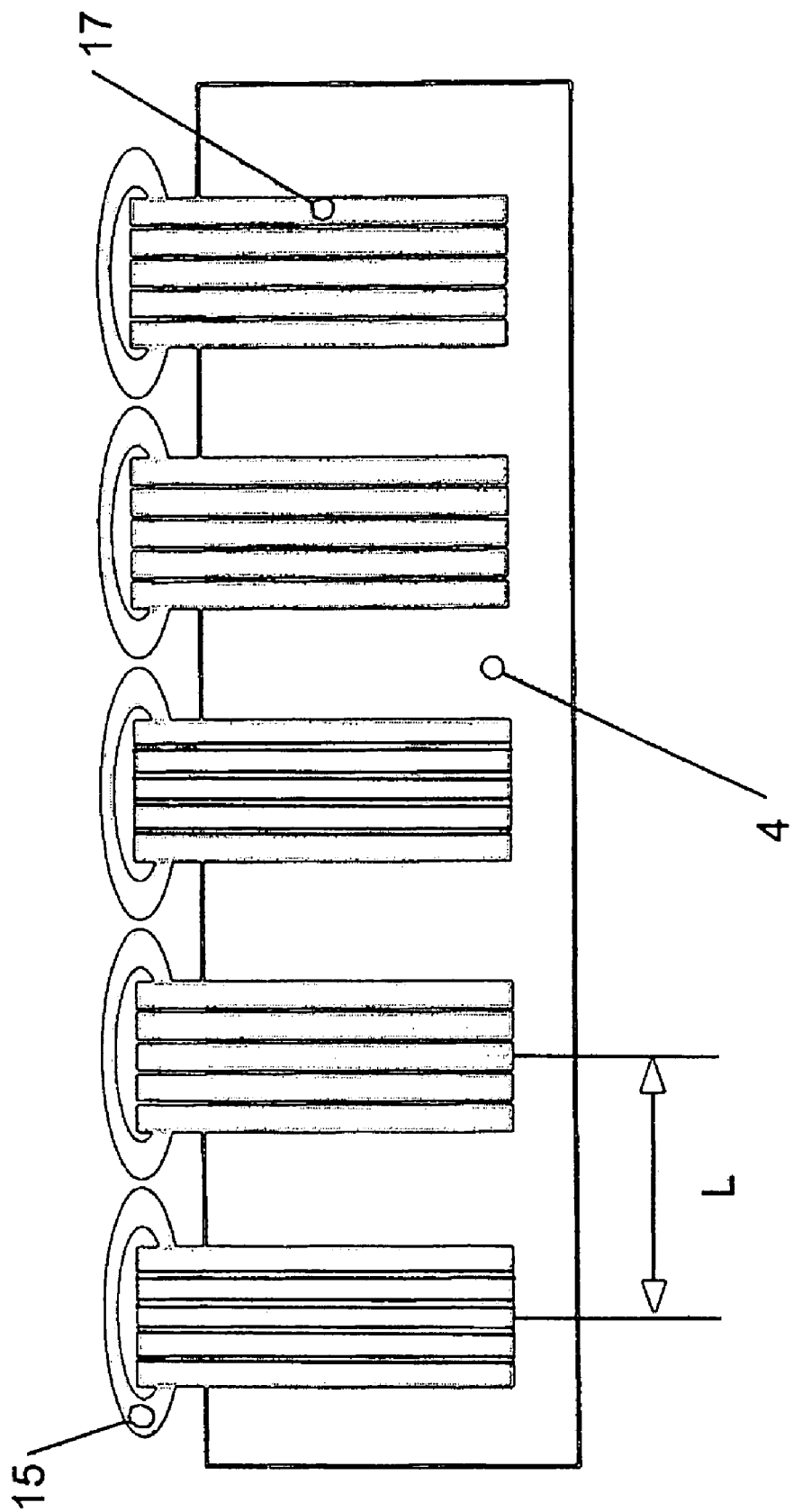
FIG. 6 is a side elevation view of the second electromagnetic coil configuration illustrated in FIG. 5.

FIGS. 5 and 6: Exterior Induction Coil Configuration

FIGS. 5 and 6 illustrate a system which could be applied onto the outside of the Carrier Pipe (4). It can be applied during construction of a new pipeline or added to an existing pipeline system where additional fluid throughput is desired.

During the manufacturing of the induction coils, a Coil of Insulated Wire or Plate (15) is wound around a plurality of "C shaped" Insulated Magnetic Laminated Material (17). The laminations are constructed such that they conform to the outside diameter of the Carrier Pipe (4) and the open ends are diametrically opposite each other. The use of this type of configuration has the advantage of concentrating the magnetic lines of flux at the open ends.

In the side view of FIG. 6, the center-to-center spacing of the Insulated Magnetic Laminated Material (17) is shown to be a distance "L". This distance "L" is determined during the design of the Electromagnetic System and is in relation to the hydraulic head of the fluid, the frequency of the power supply and the desired speed of the fluid.

Figure 7:
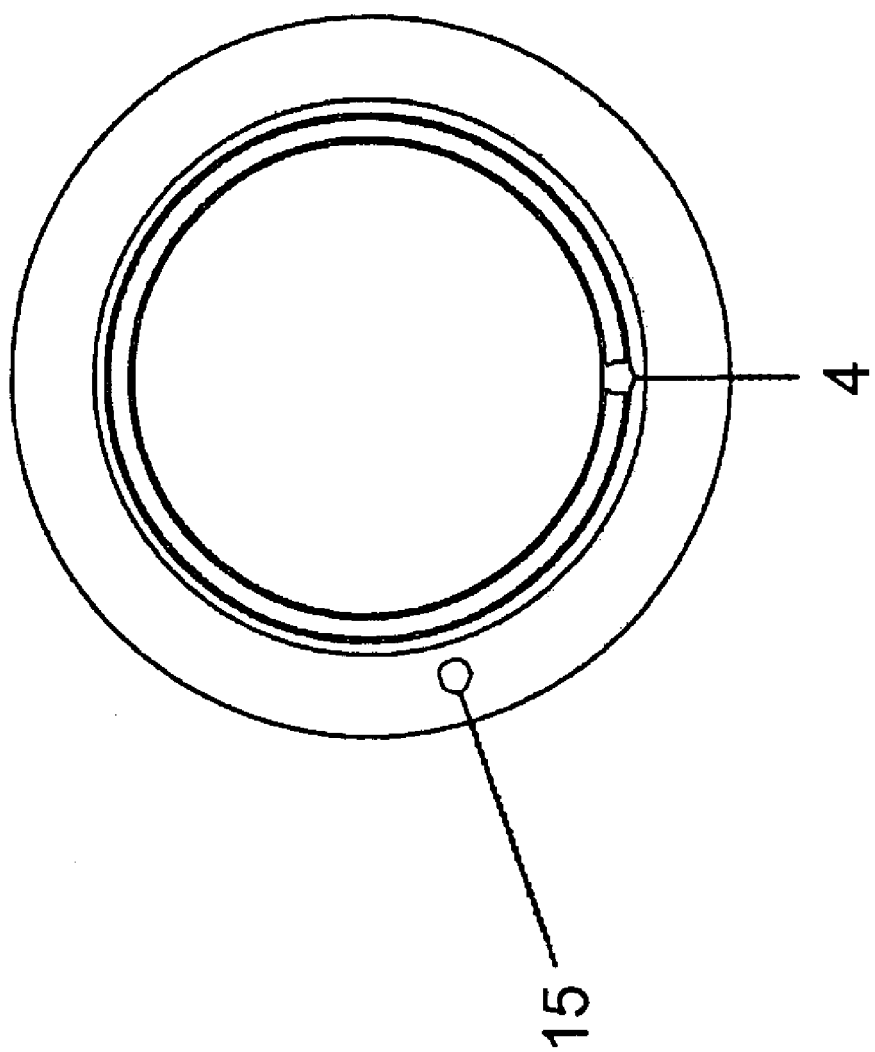
FIG. 7 is a end elevation view, in section, of a third electromagnetic coil configuration for use with the first embodiment illustrated in FIG. 1 and the second embodiment illustrated in FIG. 2.
Figure 8:
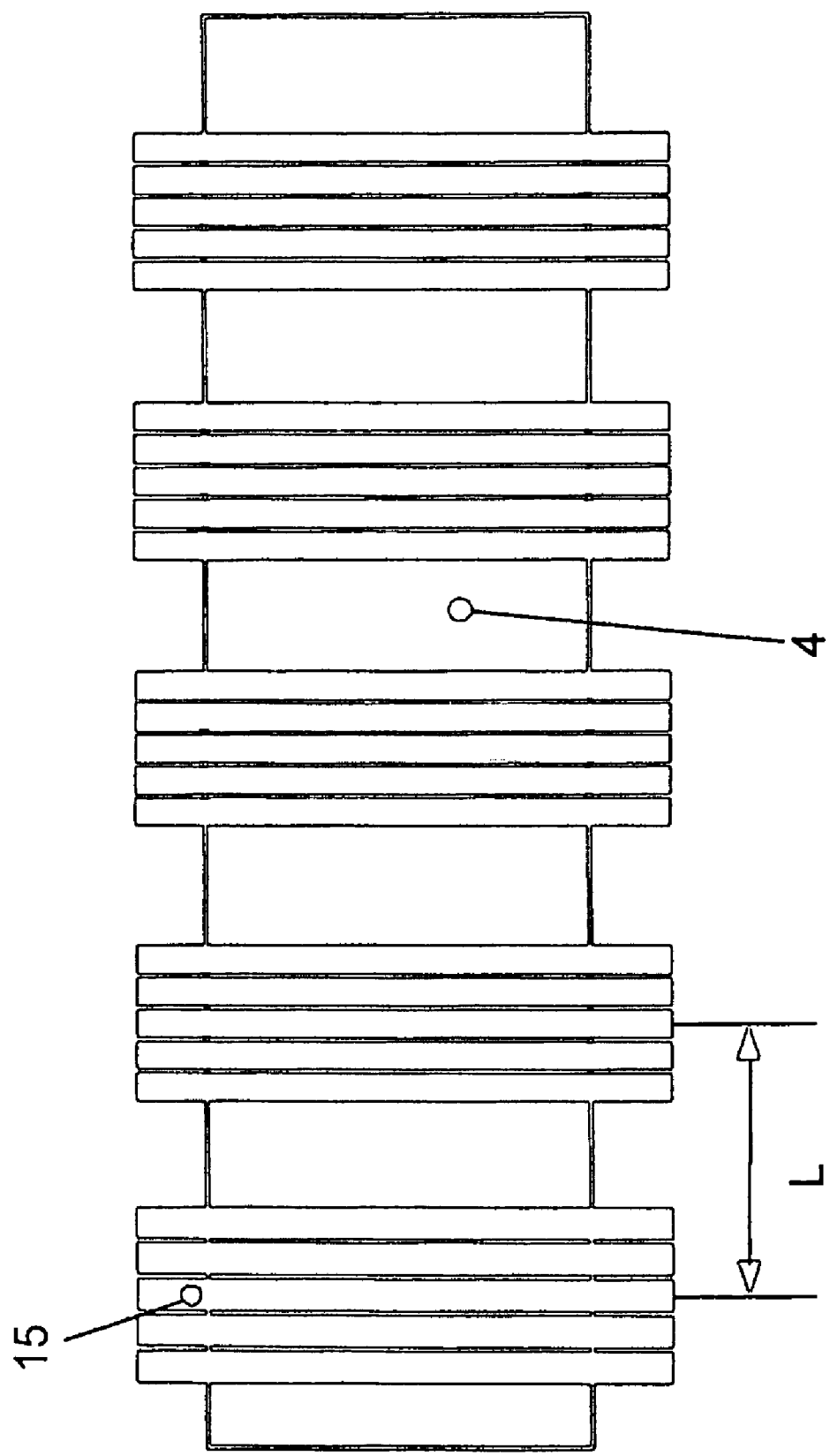
FIG. 8 is a side elevation view of the third electromagnetic coil configuration illustrated in FIG. 7.

FIGS. 7 and 8: Exterior Full Encirclement Coil Configuration

FIGS. 7 and 8 illustrate a system which could be applied onto the outside of the Carrier Pipe (4). It can be applied during construction of a new pipeline or added to an existing pipeline system where additional fluid throughput is desired.

The Coils of Insulated Wire or Plate (15) can be manufactured such that they slip over the Carrier Pipe (4) or they could be wound in place during construction. Once the Coil of Insulated Wire or Plate (15) has been formed during manufacturing, the inside layer of wire/plate should be coated with a flexible material for additional protection to the insulation.

If the Coil of Insulated Wire or Plate (15) is wound in place during construction, a thin flexible pad (not show) should be inserted between the pipe and the coil such that the insulation around the coil wire or plate is not degraded during installation or the operation of the pipeline.

In the side view of FIG. 8, the center-to-center spacing of the Coils of Insulated Wire or Plate (15) is shown to be a distance "L". This distance "L" is determined during the design of the Electromagnetic System and is in relation to the hydraulic head of the fluid, the frequency of the power supply and the desired speed of the fluid.

Figure 9:
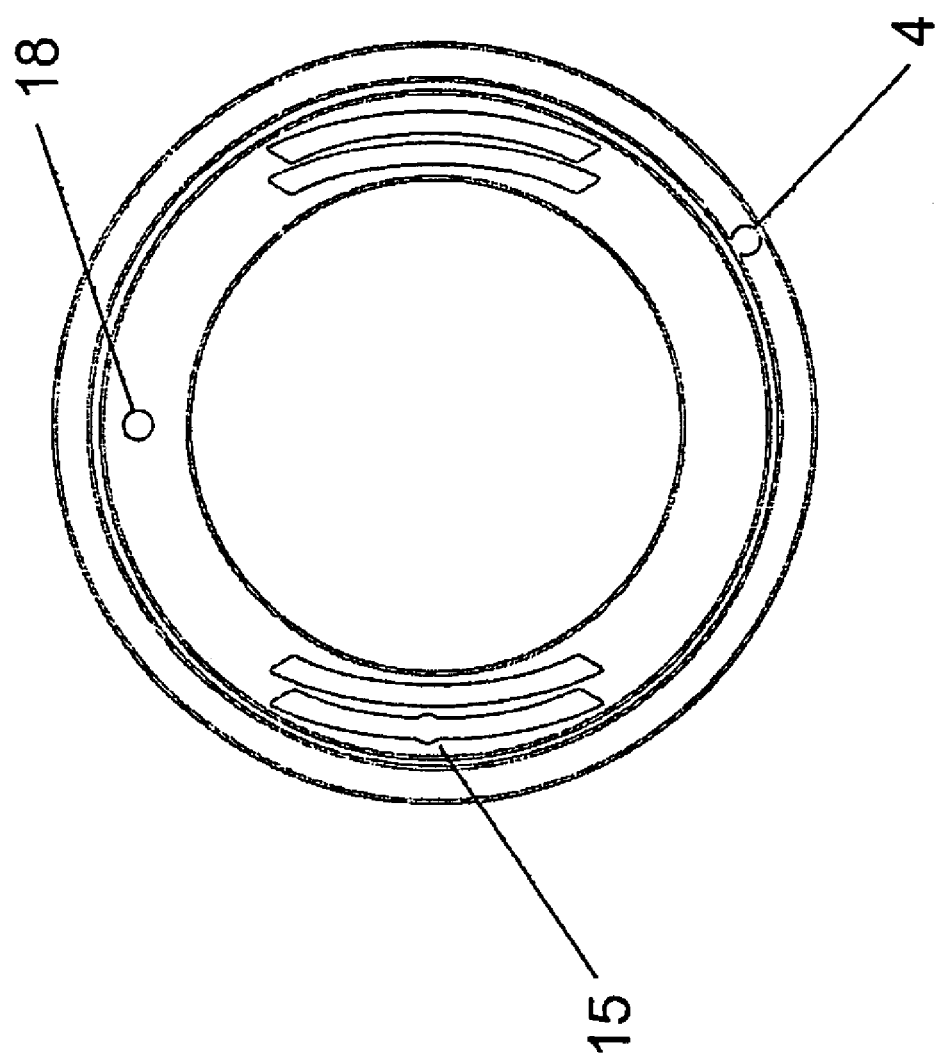
FIG. 9 is a end elevation view, in section, of a fourth electromagnetic coil configuration for use with the first embodiment illustrated in FIG. 1 and the second embodiment illustrated in FIG. 2.
Figure 10:
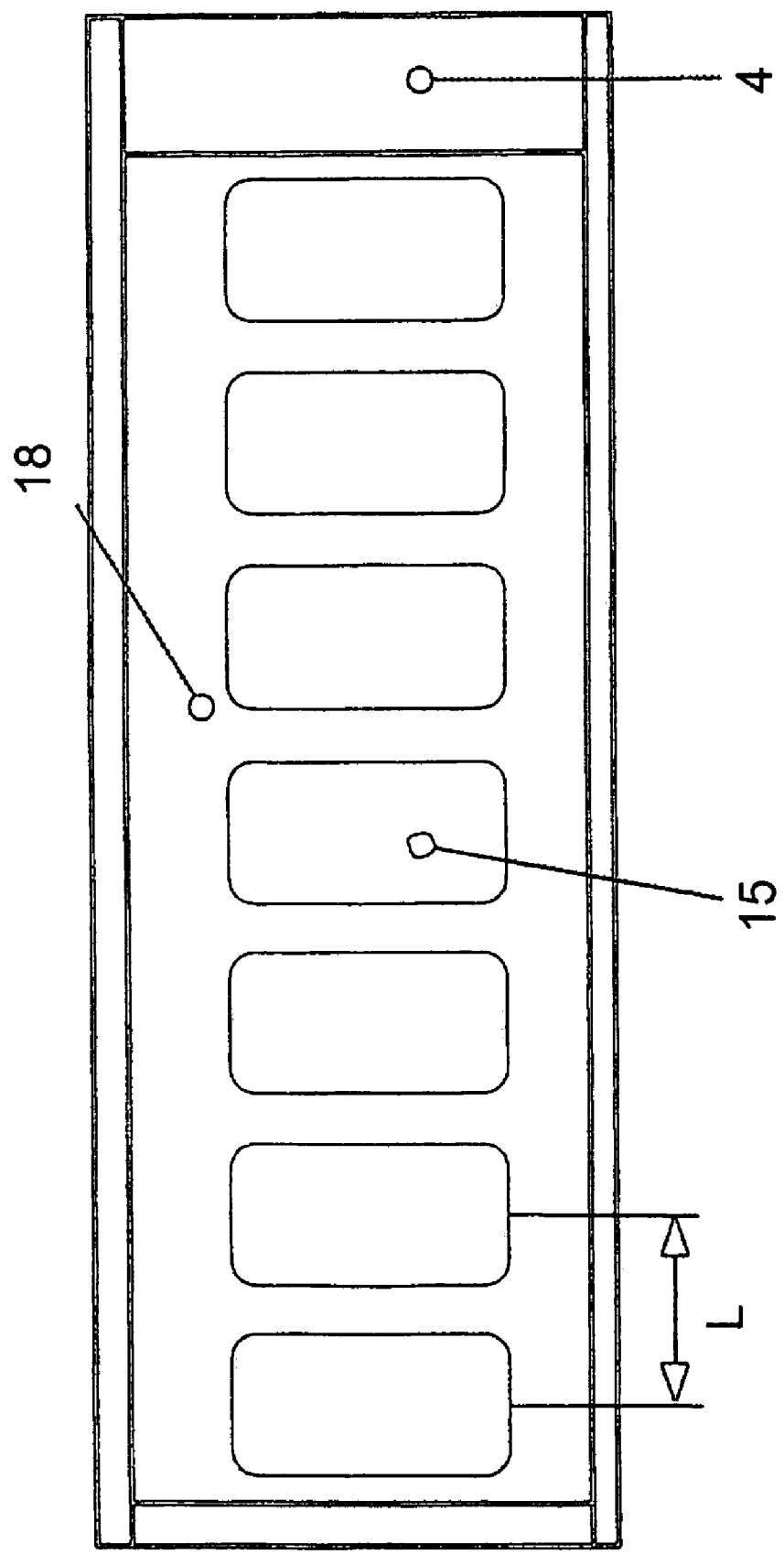
FIG. 10 is a side elevation view, in section, of the fourth electromagnetic coil configuration illustrated in FIG. 9.

FIGS. 9 and 10: Internal Liner with Wrap Coil Configuration

FIGS. 9 and 10 illustrate a system which could be applied into the inside of the Carrier Pipe (4). It would typically be added to an existing pipeline system where additional fluid throughput is desired or where a reduction in operating pressure is desired.

The liner is manufactured from a non-ferrous material which has some flexibility when formed into a pipe. During the manufacturing process, the Coils of Insulated Wire or Plate (15) are embedded into the liner. Also embedded into the flexible material are optional reinforcing cables, power cables and telecommunication cables (all not shown in Figure). The reinforcing cables could be used during loading, unloading and installation of the Liner with Embedded Coil Assembly (18); the power cables could be used to supply power to the Coils of Insulated Wire or Plate (15) and; the telecommunication cables could carry operating data of the Electromagnetic System to a central pipeline operations center.

For liners of small diameter, the liners could be wound onto a spool for transportation and handling during construction. For larger diameters, the liners would be formed in lengths of approximately 20 meters.

In the side view of FIG. 10, the center-to-center spacing of the Coils of Insulated Wire or Plate (15) is shown to be a distance "L". This distance "L" is determined during the design of the Electromagnetic System and is in relation to the hydraulic head of the fluid, the frequency of the power supply and the desired speed of the fluid.

Figure 11:
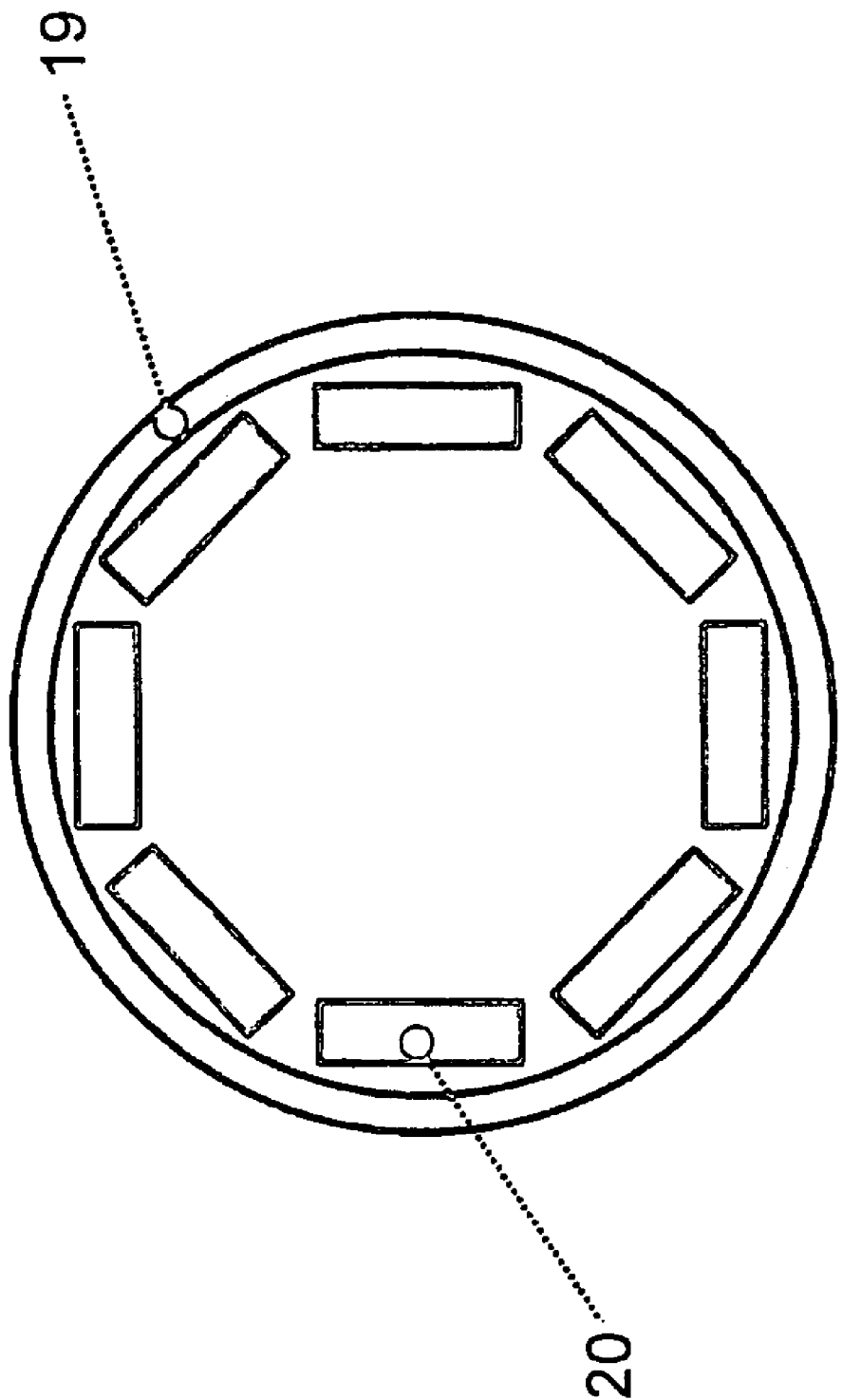
FIG. 11 is a end elevation view, in section, of a first embodiment of pipeline pig configuration for use with the first embodiment illustrated in FIG. 1 and the second embodiment illustrated in FIG. 2.
Figure 12:
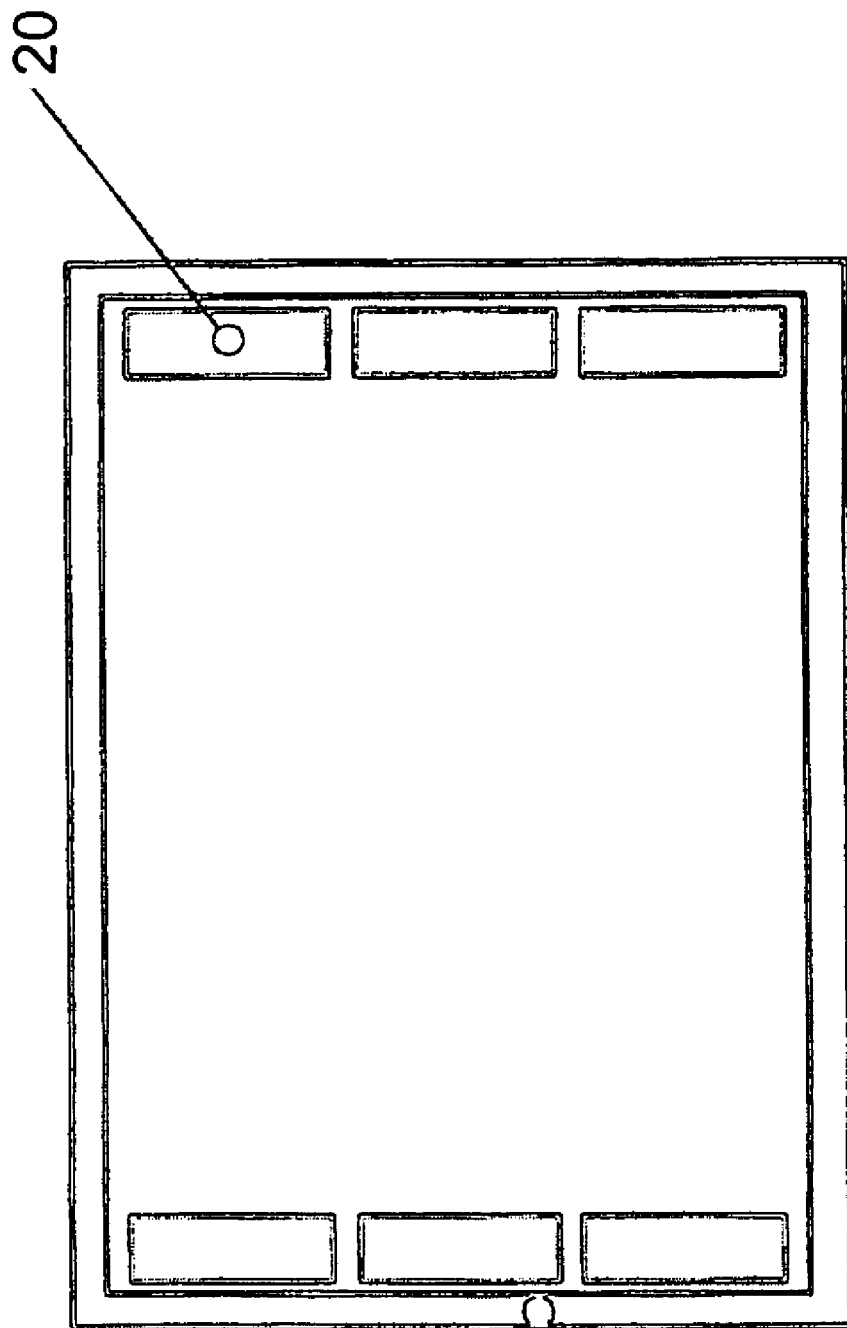
FIG. 12 is a side elevation view, in section, of the pipeline pig configuration illustrated in FIG. 11.

FIGS. 11 and 12: Cylindrical Pipeline Pig with Permanent Magnet Configuration

Figure 13:
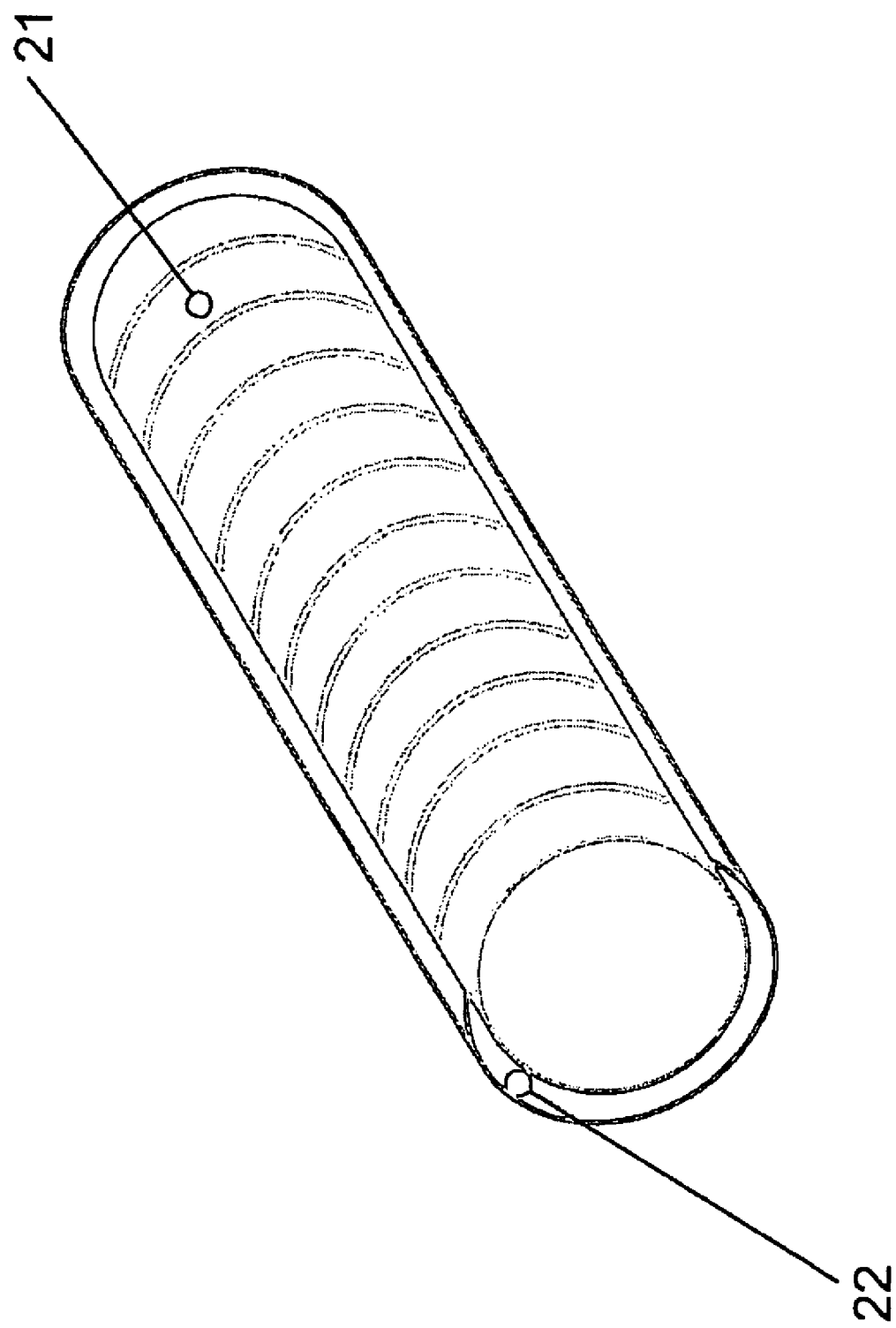
FIG. 13 is a partially cut away perspective view of a second embodiment of pipeline pig configuration for use with the first embodiment illustrated in FIG. 1 and the second embodiment illustrated in FIG. 2.

The Pipeline pig is the device which is propelled through the pipeline system to increase the velocity of the fluid in the pipeline. It is the movable (secondary) member of an electromagnetic motor. The pipeline pig can either be spherical (not shown on Figures) or cylindrical as shown in FIGS. 11, 12 and 13. Magnetic flux is provided by permanent magnets (20), DC powered electromagnets (not shown on Figures) or superconducting magnets (not shown on Figures). The alignment of the magnets is such that they are near the outer circumference of the pipeline pig and are in a ring formation. There may be multiple rows of rings (not shown) and they may be located at the ends or centrally located (not shown on Figures) along the length of the pipeline pig.

The magnetic field produced by the magnets in the pipeline pig links with the moving magnetic field in the coils to propel the pipeline pig in the pipeline.

The body of the pipeline pig may be made from Non-magnetic, non-conductive Material (19) and should be flexible yet strong enough to withstand large compressive forces.

Some electronic hardware (not shown on Figures) can be accommodated in the body of the pipeline pig.

The diameter of the pipeline pig is less than the internal diameter of the pipe or liner within which the pipeline pig is moving. The Pipeline pig remains centered in the by the interaction of the magnetic field of the Pipeline pig and the electromagnetic field in the coil assembly. Thus wear is minimized on the pipeline pig and the pipe. The length of the pipeline pig is dependent on the diameter of the pipe in which it is moving, the severity of bends likely to be encountered and the spacing of the coils.

FIG. 13: Cylindrical Pipeline Pig with Induction Magnet Configuration

An induction magnet configuration is used in conjunction with the induction coil system shown in FIGS. 5 and 6 Exterior Induction Coil Configuration. It is comprised of Mutually Insulated Laminations of Magnetic Material (21) and covered by an Outer Sheath of Non-magnetic, Conductive Material (22) such as aluminum. The sheath should protrude beyond the other most laminations such that an electric current can be induced into the sheath. The induced current then induces a magnetic field in the Mutually Insulated Laminations of Magnetic Material (21). The moving magnetic field in the coils links with the magnetic field in the pipeline pig to move the pipeline pig in the pipeline.

The diameter of the pipeline pig is less than the internal diameter of the pipe or liner within which the pipeline pig is moving. Thus wear is minimized on the pipeline pig and the pipe. The length of the pipeline pig is dependent on the diameter of the pipe in which it is moving, the severity of bends likely to be encountered and the spacing of the coils.

Figure 14:
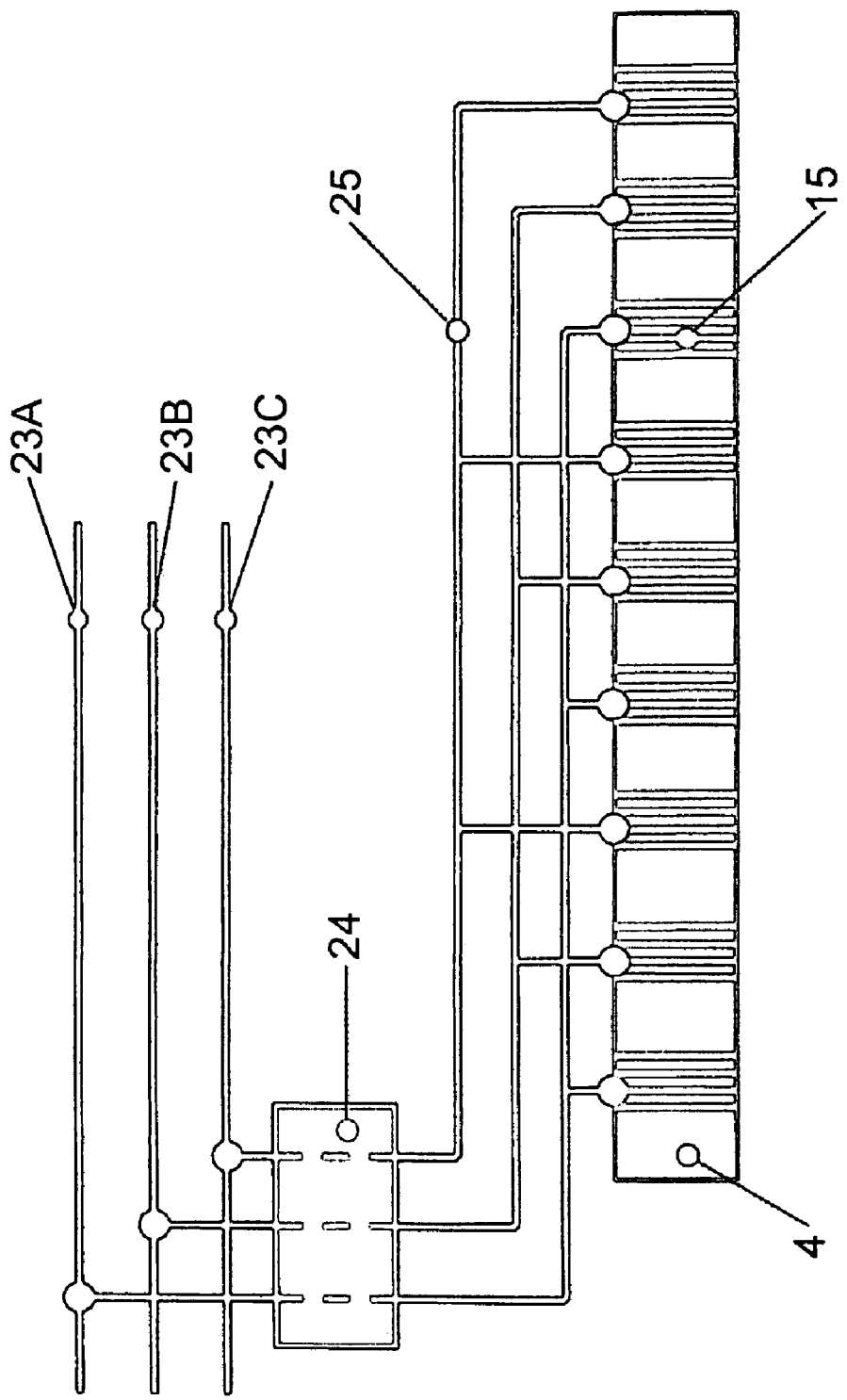
FIG. 14 is a schematic view of a controller for use with the first embodiment illustrated in FIG. 1 and the second embodiment illustrated in FIG. 2.

FIG. 14: Schematic of Controller and Parallel Wiring of Coils

This figure shows one way of supplying power to the Coil of Insulated Wire or Plate (15). Typically a three phased current is used and is shown as Phase Feed Cables (23A, 23B, 23C). To conserve energy, a Controller (24) is used to turn the power on in a section of coils when there is a pipeline pig within the section and turn the power off when the pipeline pig leaves the section. Signals from pressure transducers (not shown) located strategically along the pipeline affectively monitor the location and speed of the pipeline pigs and the data collected is relayed to the Controller (24) such that power is turned on/off at the appropriate time in a particular section.

Each of the three phases is connected in parallel to a set of coils by the Power Cables to Coil Assembly (25) as shown in FIG. 14. When the sets of coils are activated by current flow, a magnetic field is developed around each of the coils in the set. Since each set of coils is powered by a different phase, the magnetic field around the coils appears to travel down the pipe. This traveling magnetic field produced by the coils links with the magnetic field in the pipeline pigs and thus propels the pipeline pig in the direction of the traveling magnetic field produced by the coils.

The Controller (24) also determines the direction of the current flowing in the Coils of Insulated Wire or Plate (15). By reversing the current flow, the pipeline pigs are made to travel in the reverse direction. This would be useful if there was a leak or rupture in the Carrier Pipe. With this feature, pipeline pigs on each side of the leak or rupture could be made to travel in opposite directions. In this scenario, the pipeline pigs could be used to minimize the loss of the product flowing in the pipe.

Figure 15:
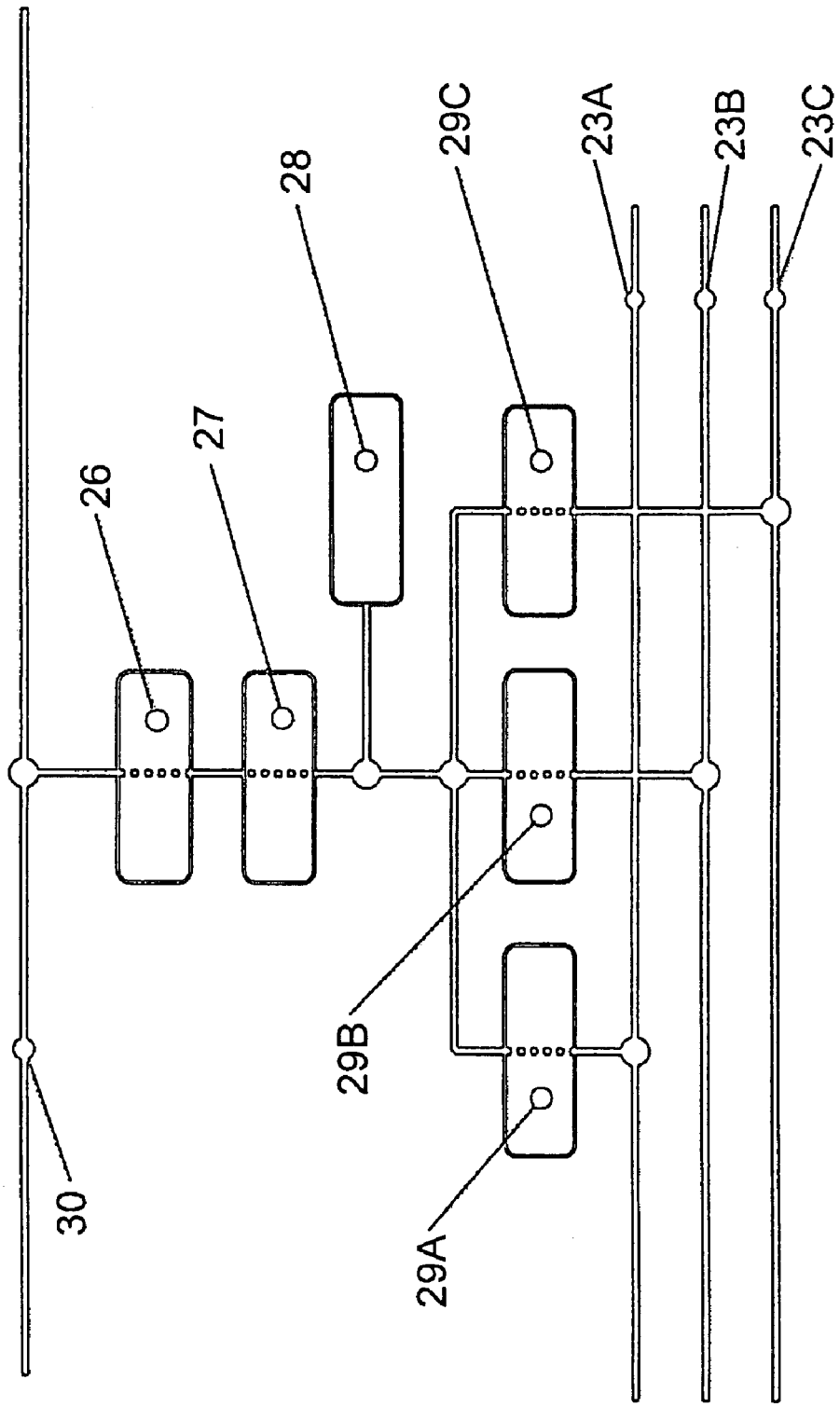
FIG. 15 is a block diagram schematic view of a power conditioning system for use with the first embodiment illustrated in FIG. 1 and the second embodiment illustrated in FIG. 2.

FIG. 15: Schematic of Power Conditioning System

This schematic shows one way to condition power from a local electrical grid such that it is appropriate for use in the electromagnetic system.

The Power Line from Local Grid (30) is used as input power for the power conditioning system. The power conditioning system is an arrangement of transformers (26), rectifiers (27), choppers (28) and inverters (29A, 29B, 29C). The output of the inverters is a three phase variable voltage, variable frequency power source which is connected to the Phase Feed Cables (23A, 23B, 23C). The variable voltage facilitates a variable current supply to the coils and therefore a variable magnetic field around the coils. The variable frequency allows control over the speed of the traveling magnetic field produced by the different sets of coils.

By adjusting the strength of the magnetic field (adjusting the current in the sets of coils) in the coils, the number of pipeline pigs in the system can be optimized for a given fluid. By adjusting the speed of the traveling magnetic field, the speed of the pipeline pigs, and therefore the velocity of the fluid in the pipeline, can be optimized for a particular set of pipeline operating conditions (e.g. flow rate of the fluid, fluid pressure, fluid temperature).

Alternate Propulsion Systems

It will be appreciated by one skilled in the art that the manner of propelling the pipeline pig is not critical to the invention. There are other ways of propelling the pipeline pig, such as:

1) Fluid Properties Converted to Propel Pipeline Pig

A small portion of the fluid being transported in the pipeline is used to produce energy in the Pipeline pig. For example, in a natural gas pipeline, the Pipeline pig is fitted with a fuel cell(s) which combines natural gas from the pipeline with onboard oxygen in the Pipeline pig to produce electrical energy in the Pipeline pig. The electrical energy is then used to drive an electrical motor(s) in the Pipeline pig. The electric motor then propels an axle(s) and wheel(s) assembly. The wheels are arranged such that they make contact with the inside of the carrier pipe. When the electric motor is turned on, the wheels turn and the Pipeline pig is propelled in the carrier pipe. An onboard control system is programmed to accept remote signals such that controllable variable Pipeline pig velocities are obtained. By propelling a sequence of synchronized Pipeline pigs, the fluid flows faster. Similar arrangements can be made for other hydrocarbon fluids transported in the carrier pipe.

2) Pipeline Pressure Converted to Propel Pipeline Pig

A small portion of the pressure in the carrier pipe is used to drive an apparatus such as an air motor. The air motor is carried onboard the Pipeline pig and converts the pressure in the carrier fluid into mechanical energy to rotate a shaft(s). Wheels are connected to the shaft(s) to form an assembly. The wheels are arranged such that they make contact with the inside of the carrier pipe. When the motor is turned on, the wheels turn and the Pipeline pig is propelled in the carrier pipe. An onboard control system is programmed to accept remote signals such that controllable variable Pipeline pig velocities are obtained. By propelling a sequence of synchronized Pipeline pigs, the fluid flows faster.

3) Electrically Powered Pipeline Pig

This method can be used when the carrier pipe can conduct electricity. A voltage is impressed on the carrier pipe of sufficient magnitude such that an electric motor onboard the Pipeline pig can be used to propel the Pipeline pig in the carrier pipe. The electrical energy is transmitted from the pipe to the Pipeline pig by a brush(es) located on the Pipeline pig which makes sliding contact with the interior of the carrier pipe. The electrical energy is then used to drive an electrical motor(s) in the Pipeline pig. The electric motor then propels an axle(s) and wheel(s) assembly. The wheels are arranged such that they make contact with the inside of the carrier pipe. When the electric motor(s) is turned on, the wheels turn and the Pipeline pig is propelled in the carrier pipe. An onboard control system is programmed to accept remote signals such that controllable variable Pipeline pig velocities are obtained. By propelling a sequence of synchronized Pipeline pigs, the fluid flows faster.

4) Magnetic Field Propels Pipeline Pig

This method can be used when the carrier pipe can conduct electricity. An alternating current is allowed to flow in the carrier pipe metal. This alternating current induces a traveling magnetic field within the hollow portion of the pipeline which is carrying the fluid to be transported. Due to the cylindrical nature of a pipeline, the magnetic field is concentrated at the geometric center of the pipe. The Pipeline pig is fitted with an onboard magnetic source such that it links with the traveling magnetic field inside the pipeline. By controlling the velocity of the traveling magnetic field (through the frequency of the current impressed in the pipe material), the link with the Pipeline pig is controlled. By propelling a sequence of synchronized Pipeline pigs, the fluid flows faster.

5) Degradable Pipeline Pigs

Through the study of magneto-hydrodynamics it is possible to design a degradable Pipeline pig such that you can avoid the complexity of returning the Pipeline pig to the start of the electromagnetic system for reuse. In this scenario, the Pipeline pig would not have a solid body but would be comprised of a slug of electrically conducive fluid (e.g. water). The electrically conducive fluid would be injected into the fluid being transported by the carrier pipe but be injected in such a manner that it remains separated from the fluid being transported by the carrier pipe. When the slug of electrically conducive fluid encounters the traveling magnetic field, established by the electromagnetic system, an electric field and consequently a current may be induced in the slug. The induced current then interacts with the traveling magnetic field to propel the slug. The velocity of the degradable Pipeline pig is controlled by the frequency of the power in the electromagnetic system. By propelling a sequence of synchronized Pipeline pigs, the fluid flows faster. Once the degradable Pipeline pig has come to the end of the electromagnetic system, it is separated from the carrier fluid or allowed to mix with the carrier fluid.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

I claim:

1. A method of enhancing fluid velocity in a pipeline, comprising the step of:
   providing pipeline pigs that block fluid flow through the pipeline by forming a seal with an inside surface of the pipeline;
   providing an electromagnetic thrust system on the pipeline to provide propulsion, guidance and suspension for the pipeline pigs to propel the pipeline pigs along the pipeline independent of fluid pressure, the electromagnetic thrust system including coils on the pipeline which interact with the pipeline pigs; and
   propelling the pipeline pigs sequentially through the pipeline containing fluid at speeds in excess of that provided by a pressure system for the pipeline, such that the fluid is pushed by the pipeline pigs and fluid is drawn by areas of low pressure created by the passage of the pipeline pigs through the pipeline.

2. The method defined in claim 1, the pipeline pigs being propelled at speeds which are a multiple of a fluid speed provided by the pressure system for the pipeline, thereby multiplying the capacity of the pipeline.

3. The method as defined in claim 1, the fluid in the pipeline being one of a liquid, a gas, a slurry or a fluidized solid.

4. The method as defined in claim 1, container capsules being concurrently moved through the pipeline by the pipeline pigs.

5. The method as defined in claim 4, the pipeline pigs being modified to serve as container capsules.

6. The method as defined in claim 1, the electromagnetic thrust system including electromagnetic motors, the electromagnetic motors being one of linear synchronous motors, linear motors, linear induction motors, linear electrodynamic motors, and pulsed linear induction motors.

7. The method as defined in claim 1, magnets being incorporated into the pipeline pig.

8. The method as defined in claim 7, the magnets being one of permanent magnets, electromagnets, induction magnets, and superconducting magnets.

9. The method as defined in claim 1, the pipeline pigs being one of rigid body, magnetorheological fluids (fluids that harden in the presence of a magnetic field and becomes liquid again when the magnetic field is removed), and ionized slugs of fluid.

10. The method as defined in claim 1, the coils being configured in one of multi-layered, pancake, flat plate or diamond.

11. The method as defined in claim 1, the coils incorporating ferromagnetic materials.

12. The method as defined in claim 1, the coils being applied to an outside of the pipeline.

13. The method as defined in claim 12, the coils being oriented in one of the following orientations: parallel to a longitudinal axis of the pipeline or fully encircling the pipeline perpendicular to the longitudinal axis of the pipeline.

14. The method as defined in claim 1, the coils being embedded in a pipeline liner.

15. The method as defined in claim 1, a power source being used that is one of alternating current or direct current.

16. The method as defined in claim 15, the power source being provided by one of connecting to an electric power grid or by generating the appropriate power adjacent to the pipeline.

17. The method as defined in claim 16, a combination of transformer(s), rectifier(s), chopper(s) and inverter(s) being used to condition the power from the power source to provide multi-phased, variable voltage, variable frequency power.

18. The method as defined in claim 1, a switching system being incorporated into the coil system such that energization of the coils is done in such a manner as to appropriately propel/suspend/hold the pipeline pigs and minimize power consumption.

19. The method as defined in claim 1, an electromagnetic holding zone is provided to load the pipeline pigs into the pipeline while preventing fluid flow through the holding zone.

20. The method as defined in claim 1, the pipeline pigs being propelled for a substantial distance along the pipeline.

21. The method as defined in claim 1, the pipeline pigs being propelled only at selected locations where it is desirable to increase fluid velocity or pressure.

22. The method as defined in claim 1, a pipeline pig return line being provided.

23. An apparatus for enhancing fluid velocity in a pipeline, comprising in combination:

pipeline pigs that block fluid flow through a pipeline by forming a seal with an inside surface of the pipeline;

a pipeline having holding zone to load the pipeline pigs into the pipeline while preventing fluid flow through the holding zone and a separation zone in which the pipeline pigs are removed from the fluid flow; and an electromagnetic thrust system on the pipeline to provide propulsion, guidance and suspension for the pipeline pigs including coils on the pipeline which interact with the pipeline pigs for propelling the pipeline pigs sequentially through the pipeline containing fluid at speeds in excess of fluid flow provided by a pressure system for the pipeline, such that the fluid is pushed by the pipeline pigs and fluid is drawn by areas of low pressure created by the passage of the pipeline pigs through the pipeline.

24. The apparatus as defined in claim 23, wherein the separation zone is connected to a pipeline pig return line having a larger diameter which returns the pipeline pigs to the holding zone.

25. The apparatus as defined in claim 23, wherein the pipeline pigs are propelled at speeds which are a multiple of a fluid speed provided by the pressure system for the pipeline, thereby multiplying the capacity of the pipeline.

26. The apparatus as defined in claim 23, wherein the electromagnetic thrust system includes electromagnetic motors, the electromagnetic motors being one of linear synchronous motors, linear motors, linear induction motors, linear electrodynamic motors, and pulsed linear induction motors.

27. The apparatus as defined in claim 23, wherein magnets are incorporated into the pipeline pigs.

28. The apparatus as defined in claim 27, wherein the magnets are one of permanent magnets, electromagnets, induction magnets, and superconducting magnets.

29. The apparatus as defined in claim 23, wherein the pipeline pigs are one of rigid body, magnetorheological fluids (fluids that harden in the presence of a magnetic field and becomes liquid again when the magnetic field is removed), and ionized slugs of fluid.

30. The apparatus as defined in claim 23, wherein the coils are configured in one of multi-layered, pancake, flat plate or diamond.

31. The apparatus as defined in claim 23, wherein the coils incorporate ferromagnetic materials.

32. The apparatus as defined in claim 23, wherein the coils are applied to an outside of the pipeline.

33. The apparatus as defined in claim 23, wherein the coils are oriented in one of the following orientations: parallel to a longitudinal axis of the pipeline or fully encircling the pipeline perpendicular to the longitudinal axis of the pipeline.

34. The apparatus as defined in claim 23, wherein the coils are embedded in a pipeline liner.

35. The apparatus as defined in claim 23, wherein a power source used to power the electromagnetic thrust system is one of alternating current or direct current.

36. The apparatus as defined in claim 35, wherein the power source is provided by one of connecting to an electric power grid or by generating the appropriate power adjacent to the pipeline.

37. The apparatus as defined in claim 35, wherein a combination of transformer(s), rectifier(s), chopper(s) and inverter(s) are used to condition the power from the power source to provide multi-phased, variable voltage, variable frequency power.

38. The apparatus as defined in claim 23, wherein a switching system is incorporated into the coil system such that energization of the coils is done in such a manner as to appropriately propel/suspend/hold the pipeline pigs and minimize power consumption.

39. An apparatus for enhancing fluid velocity in a pipeline, comprising in combination:

pipeline pigs that block fluid flow through a pipeline by forming a seal with an inside surface of the pipeline and equipped with magnets capable of generating a magnetic field;

a pipeline having holding zone to load the pipeline pigs into the pipeline while preventing fluid flow through the holding zone and a separation zone in which the pipeline pigs are removed from the fluid flow, the separation zone being connected to a pipeline pig return line which returns the pipeline pigs to the holding zone;

an electromagnetic thrust system to provide guidance and suspension of the pipeline pigs, the electromagnetic thrust system including coils on the pipeline which provide an alternating current to the pipeline to induce a travelling magnetic field which interacts with the magnetic field in the pipeline pigs, propelling the pipeline pigs sequentially through the pipeline containing fluid at speeds which are a multiple of a fluid speed provided by a pressure system for the pipeline;

a switching system for selectively energizing the coils to propel the pipeline pigs through the pipeline; and a controller for controlling pipeline pig velocities.

* * * * *